US011163129B2

(12) United States Patent
Larsson et al.

(10) Patent No.: US 11,163,129 B2
(45) Date of Patent: Nov. 2, 2021

(54) STACKABLE SPLITTERS

(71) Applicant: PPC Broadband, Inc., East Syracuse, NY (US)

(72) Inventors: Nicholas B. Larsson, Blomkest, MN (US); George I. Wakileh, Batavia, IL (US); Joselyn Gabriela Gamboa, Alajuela (CR)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/726,215

(22) Filed: Dec. 23, 2019

(65) Prior Publication Data

US 2020/0132955 A1  Apr. 30, 2020

Related U.S. Application Data

(63) Continuation of application No. 16/068,746, filed as application No. PCT/US2017/013535 on Jan. 13, 2017, now Pat. No. 10,514,519.

(Continued)

(51) Int. Cl.
*G02B 6/00* (2006.01)
*G02B 6/44* (2006.01)

(52) U.S. Cl.
CPC ......... *G02B 6/4454* (2013.01); *G02B 6/4441* (2013.01)

(58) Field of Classification Search
CPC ................................ G02B 6/4454; G02B 6/4441
See application file for complete search history.

(56) References Cited

U.S. PATENT DOCUMENTS

| 3,424,334 A | 1/1969 | Goltz |
| 4,643,494 A | 2/1987 | Marleau |

(Continued)

FOREIGN PATENT DOCUMENTS

| EP | 0617304 A1 * | 9/1994 | ........... G02B 6/4454 |
| WO | 2014186433 A1 | 11/2014 | |

(Continued)

OTHER PUBLICATIONS

"Fttx Solutions Passive Optical Splitter Modules 7th Edition," Broadband Network Solutions, TE Connectivity Aug. 2014 (24 pages).

(Continued)

*Primary Examiner* — Ellen E Kim
(74) *Attorney, Agent, or Firm* — MH2 Technology Law Group LLP

(57) ABSTRACT

Examples of optical splitter systems, methods and modules enable the stacking and interconnecting of one or more optical splitter modules. One example of a splitter module has a housing and one or more connection members for connecting to adjacent instances of like splitter modules. The housing includes a plurality of cable ports providing access to an optical splitter storage area. Each connection member includes a tab and a slot, the tab configured to slidingly engage with the slot of an adjacent connection member. Sliding engagement of adjacent instances of splitter modules can form a stack of splitter modules along a stacking axis. In some cases a splitter module includes a latching mechanism to removably engage an adjacent splitter module. The latching mechanism can restrict sliding engagement and thus decoupling of the adjacent splitter modules.

20 Claims, 15 Drawing Sheets

Related U.S. Application Data

(60) Provisional application No. 62/278,867, filed on Jan. 14, 2016.

(56) References Cited

U.S. PATENT DOCUMENTS

| | | | |
|---|---|---|---|
| 5,613,029 A | 3/1997 | Burek et al. | |
| 5,699,925 A | 12/1997 | Petruzzi | |
| 5,754,723 A | 5/1998 | Fremgen | |
| 5,778,132 A | 7/1998 | Csipkes et al. | |
| 5,835,657 A | 11/1998 | Suarez et al. | |
| 5,896,486 A | 4/1999 | Burek et al. | |
| 6,016,378 A | 1/2000 | Cuny et al. | |
| 6,226,434 B1 | 5/2001 | Koshiyama et al. | |
| 6,418,266 B1 | 7/2002 | Vitantonio | |
| 6,539,160 B2 | 3/2003 | Battey et al. | |
| 6,556,763 B1 | 4/2003 | Puetz et al. | |
| 7,038,137 B2 | 5/2006 | Grubish et al. | |
| 7,418,184 B1 | 8/2008 | Gonzales et al. | |
| 7,438,185 B2 | 10/2008 | Ho et al. | |
| 7,613,377 B2 | 11/2009 | Gonzales et al. | |
| 7,744,288 B2 | 6/2010 | Lu et al. | |
| 7,762,726 B2 | 7/2010 | Lu et al. | |
| D626,122 S | 10/2010 | Vogel et al. | |
| 7,889,961 B2 | 2/2011 | Cote et al. | |
| 7,959,361 B2 | 6/2011 | Lu et al. | |
| 7,970,249 B2 | 6/2011 | Solheid et al. | |
| 8,068,715 B2 | 11/2011 | Kewitsch | |
| 8,086,084 B2 | 12/2011 | Bran de Leon et al. | |
| 8,111,966 B2 | 2/2012 | Holmberg et al. | |
| 8,130,502 B2 | 3/2012 | Fransen et al. | |
| 8,340,491 B2 | 12/2012 | Zimmel | |
| 8,408,815 B2 | 4/2013 | Lin et al. | |
| 8,439,577 B2 | 5/2013 | Jenkins | |
| 8,554,044 B2 | 10/2013 | Bran de Leon et al. | |
| 8,600,208 B2 | 12/2013 | Badar et al. | |
| 8,718,434 B2 | 5/2014 | Gronvall et al. | |
| 8,768,134 B2 | 7/2014 | Puetz et al. | |
| 8,811,791 B2 | 8/2014 | Solheid et al. | |
| 8,837,894 B2 | 9/2014 | Holmberg et al. | |
| 8,875,888 B2 | 11/2014 | Koenig et al. | |
| 8,891,930 B2 | 11/2014 | Anguiano et al. | |
| 8,953,919 B2 | 2/2015 | Keith | |
| 8,958,672 B2 | 2/2015 | Mullaney et al. | |
| 9,063,296 B2 | 6/2015 | Dong et al. | |
| 9,075,216 B2 | 7/2015 | Cote et al. | |
| 9,116,324 B2 | 8/2015 | Cooke et al. | |
| 9,250,409 B2 | 2/2016 | Blackwell, Jr. et al. | |
| 9,274,300 B2 | 3/2016 | Miller et al. | |
| 9,690,065 B2 | 6/2017 | Wiltjer et al. | |
| 10,514,519 B2 | 12/2019 | Larsson et al. | |
| 2004/0149754 A1 | 8/2004 | Diamant | |
| 2005/0215101 A1 | 9/2005 | Pepe | |
| 2006/0120672 A1 | 6/2006 | Cody et al. | |
| 2006/0193586 A1 | 8/2006 | Hoehne et al. | |
| 2007/0047891 A1 | 3/2007 | Bayazit et al. | |
| 2009/0074371 A1 | 3/2009 | Bayazit et al. | |
| 2009/0202213 A1 | 8/2009 | Griffiths et al. | |
| 2009/0245743 A1 | 10/2009 | Cote et al. | |
| 2009/0274430 A1 | 11/2009 | Krampotich et al. | |
| 2010/0054682 A1* | 3/2010 | Cooke | G02B 6/4453 385/135 |
| 2010/0054684 A1 | 3/2010 | Cooke et al. | |
| 2010/0303426 A1 | 12/2010 | Davis | |
| 2010/0316333 A1 | 12/2010 | Luther et al. | |
| 2011/0019964 A1 | 1/2011 | Nhep et al. | |
| 2011/0139665 A1 | 6/2011 | Madsen | |
| 2011/0255837 A1 | 10/2011 | Solheid et al. | |
| 2011/0268405 A1 | 11/2011 | Cote et al. | |
| 2011/0268412 A1* | 11/2011 | Giraud | G02B 6/4452 385/135 |
| 2011/0293235 A1 | 12/2011 | Nieves et al. | |
| 2012/0106911 A1 | 5/2012 | Cooke et al. | |
| 2012/0114295 A1 | 5/2012 | Guzzo et al. | |
| 2013/0028567 A1 | 1/2013 | Parikh et al. | |
| 2013/0034333 A1 | 2/2013 | Holmberg et al. | |
| 2013/0129299 A1 | 5/2013 | Zimmel | |
| 2013/0170810 A1 | 7/2013 | Badar et al. | |
| 2013/0230291 A1 | 9/2013 | Lichoulas et al. | |
| 2014/0037255 A1 | 2/2014 | Mullaney et al. | |
| 2014/0044400 A1 | 2/2014 | Anguiano et al. | |
| 2014/0079365 A1 | 3/2014 | Hill et al. | |
| 2014/0133804 A1 | 5/2014 | Lu et al. | |
| 2014/0133819 A1 | 5/2014 | Trebesch et al. | |
| 2014/0219621 A1 | 8/2014 | Barnette, Jr. et al. | |
| 2014/0241670 A1 | 8/2014 | Barnette, Jr. et al. | |
| 2014/0314385 A1 | 10/2014 | Miller et al. | |
| 2014/0355945 A1 | 12/2014 | Nieves et al. | |
| 2015/0030301 A1 | 1/2015 | Solheid et al. | |
| 2016/0259129 A1 | 9/2016 | Geens et al. | |

FOREIGN PATENT DOCUMENTS

| | | | | |
|---|---|---|---|---|
| WO | 2015055586 A1 | | 4/2015 | |
| WO | WO 2015/095365 | * | 6/2015 | ............... G02B 6/00 |
| WO | 2015116672 A1 | | 8/2015 | |
| WO | 2015193384 A2 | | 12/2015 | |
| WO | 2017106012 A1 | | 6/2017 | |
| WO | 2017124018 A1 | | 7/2017 | |

OTHER PUBLICATIONS

"Fttx Solutions Standard Splitter Modules," Broadband Network Solutions, TE Connectivity Nov. 2014 (2 pages).
"Futurelink Pre-Connectorized PLC Splitters," Suttle Solutions Datasheet 2014 (2 pages).
"International Preliminary Report on Patentability," for PCT Application No. PCT/US2016/065643 dated Jun. 28, 2018 (12 pages).
"International Preliminary Report on Patentability," for PCT Application No. PCT/US2017/013535 dated Jul. 26, 2018 (12 pages).
"International Search Report and Written Opinion," for PCT Application No. PCT/US2016/065643 dated Feb. 20, 2017 (17 pages).
"International Search Report and Written Opinion," for PCT Application No. PCT/US2017/013535 dated Apr. 14, 2017 (16 pages).

* cited by examiner

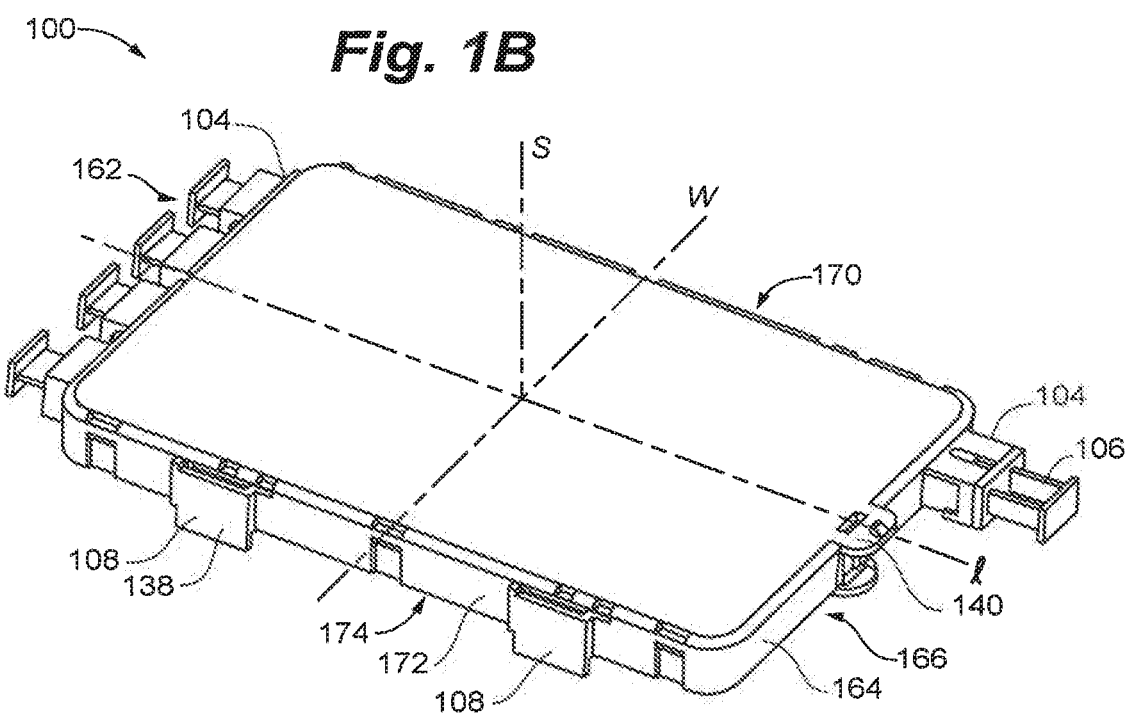

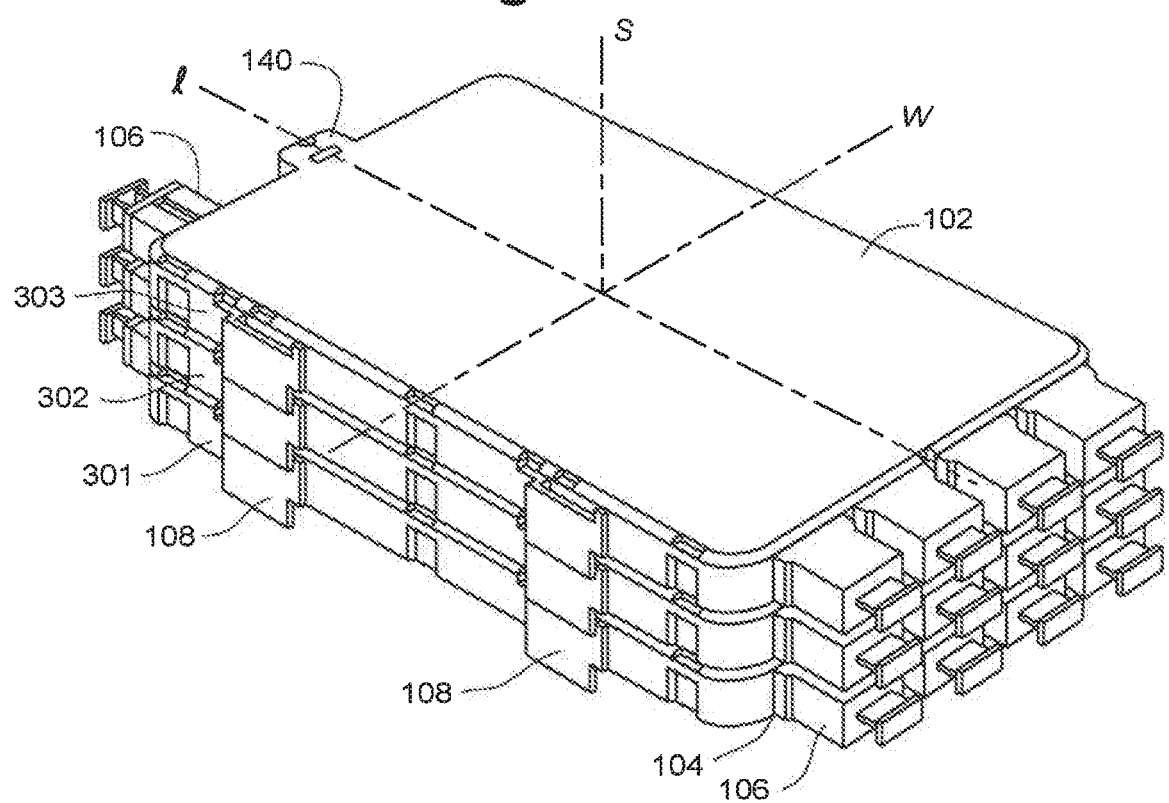

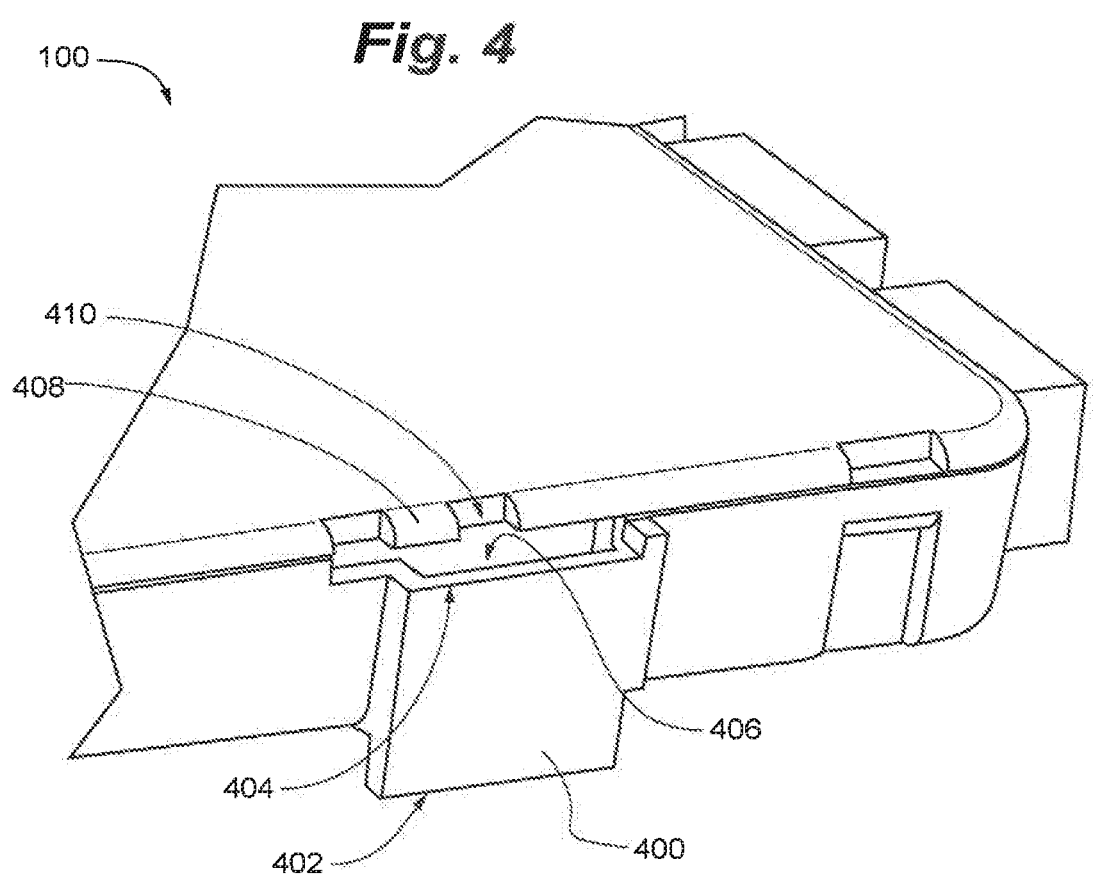

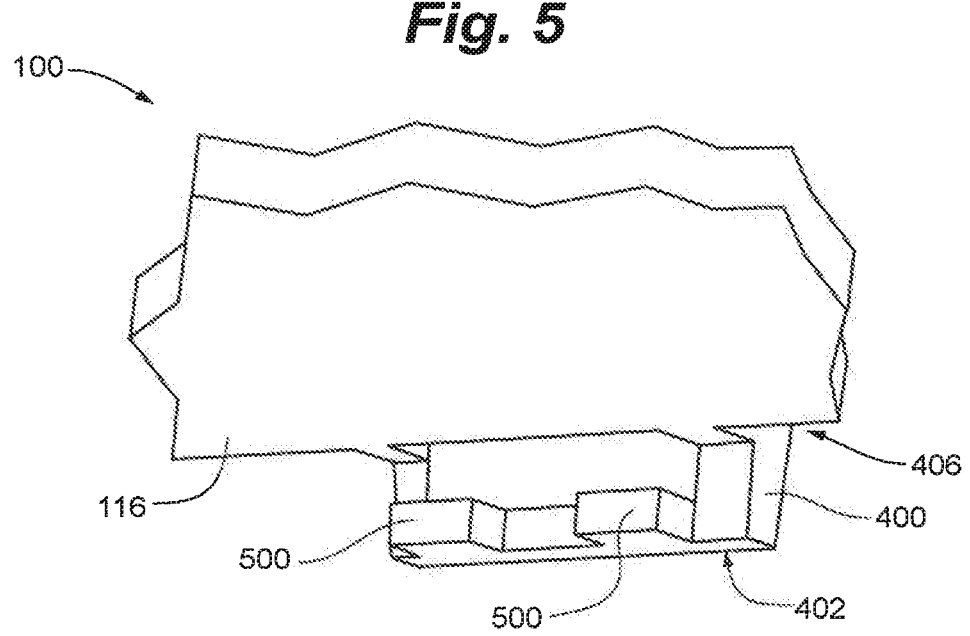

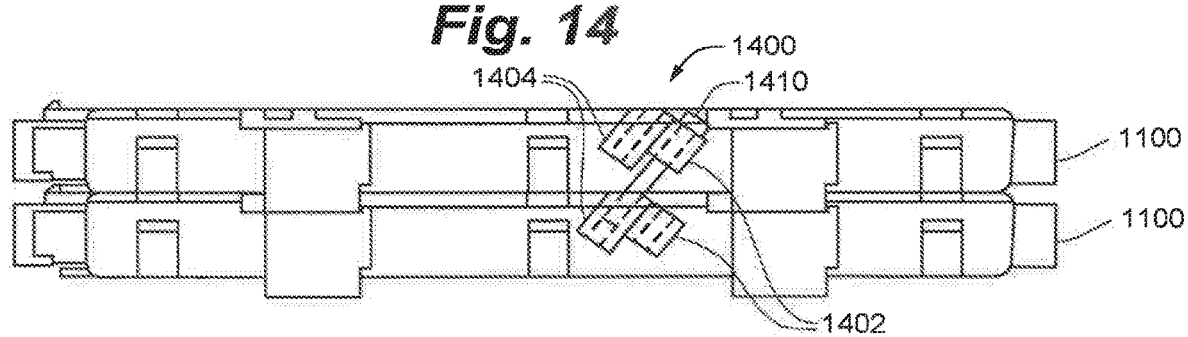

STACKABLE SPLITTERS

CROSS REFERENCE TO RELATED APPLICATIONS

This application is a continuation of U.S. application Ser. No. 16/068,746, filed Jul. 9, 2018, which is a National Stage Entry of PCT International Patent application PCT/US2017/013535, filed on Jan. 13, 2017, in the name of Communications Systems, Inc., a U.S. national corporation, applicant for the designation of all countries and Nicholas B. Larsson, a U.S. Citizen, George I. Wakileh, a U.S. Citizen, and Joselyn Gabriela Gamboa, a Citizen of Costa Rica, inventors for the designation of all countries, and claims priority to U.S. Provisional Patent Application No. 62/278,867, filed Jan. 14, 2016, the contents of which are herein incorporated by reference in its entirety.

FIELD

This disclosure generally relates to communications networks and components, and more particularly relates to optical splitters.

BACKGROUND

Splitter modules are a known component of telecommunications networks. In a typical installation, multiple splitter modules are installed in a telecommunications enclosure within a separate housing or framework. The housing or framework typically includes a mounting structure for holding the splitter modules. Various splitter configurations can require different numbers and types of mounting structures due to differences in the design of the modules. The overall cost of a telecommunications enclosure can thus rise due to the need for elaborate, complex splitter housings and mounting hardware tailored to different module designs.

SUMMARY

Examples of optical splitter modules and systems and methods are described for arranging splitter modules without traditional mounting hardware. As will be discussed, splitter module implementations may include mounting features that allow individual splitter modules to be interconnected without additional hardware. In some cases the mounting features allow splitter modules to be interconnected in a stack configuration, with each successive module being connected to an adjacent module without the need for an external frame or support. Stacking and mounting the individual splitter modules to each other can in some cases provide a rapid and easily deployable mounting system in which additional hardware, such as external mounting frameworks, are unneeded.

Some examples of various aspects, implementations, and features of stackable splitter modules, module arrangements, and methods for arranging splitter modules will now be described.

One general aspect includes a cable splitter module. The cable splitter module includes a housing and a connection member. The housing has a length extending along a longitudinal axis of the housing, a width extending transverse to the longitudinal axis along a width axis, and a stacking axis that is perpendicular to the longitudinal axis and to the width axis. The housing includes an optical splitter storage area and a plurality of cable ports providing access to the optical splitter storage area for a plurality of optical fiber cables. The housing also includes a first end wall at a first end of the housing and a second end wall at a second end of the housing opposite the first end of the housing. The housing also includes a first side wall at a first side of the housing and a second side wall at a second side of the housing opposite the first side of the housing.

The cable splitter module includes the connection member at the first side of the housing. The connection member includes a rigid wall member having a first end and a second end, the second end including a tab projecting from the wall member. The connection member also includes a slot extending substantially parallel to the longitudinal axis of the housing.

The connection member is configured to connect to an adjacent instance of the connection member on an adjacent cable splitter module. The tab of the connection member is configured to slidingly engage with the slot of an adjacent connection member in a first connection configuration that restricts relative movement of the cable splitter module and the adjacent cable splitter module along the stacking axis. The slot of the connection member is configured to slidingly engage with the tab of the adjacent connection member in a second connection configuration that restricts relative movement of the cable splitter module and the adjacent cable splitter module along the stacking axis. The cable splitter module is thus connectable to an adjacent instance of the cable splitter module to form a stack of connected cable splitter modules along the stacking axis.

Implementations of the cable splitter module may also include one or more of the following features. For example, the connection member of the cable splitter module may be a first side connection member and the cable splitter module may further include a second side connection member at the second side of the housing opposite from the first side connection member. The second side connection member includes a rigid wall member having a first end and a second end including a tab projecting from the wall member. The second side connection member also includes a slot extending substantially parallel to the longitudinal axis of the housing. The second side connection member is configured to connect to an adjacent instance of the second side connection member on an adjacent cable splitter module. The tab of the second side connection member is configured to slidingly engage with the slot of an adjacent second side connection member in the first connection configuration to restrict relative movement along the stacking axis. The slot of the second side connection member is configured to slidingly engage with the tab of an adjacent second side connection member in the second connection configuration to restrict relative movement along the stacking axis.

Implementations of the cable splitter module may also include one or more of the following features. The cable splitter module may be configured such that sliding engagement of the first side connection members and the second side connection members restricts side-to-side movement of the cable splitter module and the adjacent cable splitter module in a direction of the width axis. The first and second side connection members may each include an outer wall member that forms part of the respective slot, the outer wall member including a notch configured to selectively receive the tab of a respective adjacent connection member. The first side connection member and the second side connection member can form a first connection member pair. The cable splitter module may further including a second connection member pair including another first side connection member and another second side connection member. The first end of the rigid wall member of the connection member may be configured to mate with the second end of the rigid wall member of an adjacent connection member. The first end of the rigid wall member of the adjacent connection member may be configured to mate with the second end of the rigid wall member of the connection member. Mating of the ends of the rigid wall members may support the stacking of the cable splitter module and an adjacent cable splitter module along the stacking axis.

Implementations of the splitter module may also include one or more of the following features. The cable splitter module may include a latching mechanism at the first end of the housing. An adjacent cable splitter module may have a corresponding adjacent instance of the latching mechanism. The latching mechanism may be configured to removably engage an adjacent latching mechanism in one of the first connection configuration and the second connection configuration. The latching mechanism may be configured to removably engage an adjacent latching mechanism in the other of the first connection configuration and the second connection configuration. The cable splitter module may also be configured such that engagement of the respective latching mechanisms stops sliding disengagement of the cable splitter module and the adjacent cable splitter module. The cable splitter module can also include a locking mechanism for selectively locking the latching mechanism to prevent disengagement of the cable splitter module from an adjacent cable splitter module.

Implementations of the splitter module may also include one or more of the following features. The cable splitter module may include an optical splitter assembly positioned within the optical splitter storage area, and a plurality of fiber leads connected to the optical splitter assembly, where each of the cable ports provides access to one of the fiber leads. The cable splitter module may include a plurality of cable assemblies. Each cable assembly is connected to one of the fiber leads. Each cable assembly extends outside the housing through one of the cable ports. Each cable assembly is terminated outside the housing by an optical fiber connection member. The cable splitter module may include a plurality of cable adapters mounted within the plurality of cable ports. Each of the fiber leads may be terminated inside the housing by an optical fiber connection member configured to connect with one of the cable adapters.

Another general aspect includes an optical splitter stacking system. The optical splitter stacking system may include an optical splitter housing, which includes a bottom planar wall, a top planar wall, and an optical splitter storage area located between the bottom planar wall and the top planar wall. The optical splitter housing includes a plurality of connection members including a linear arrangement of first side connection members and a linear arrangement of second side connection members. The housing has a first side wall that includes the linear arrangement of first side connection members and a second side wall that includes the linear arrangement of second side connection members. The optical splitter housing includes a third side wall including a cable port providing access to the optical splitter storage area and a fourth side wall including a plurality of cable ports providing access to the optical splitter storage area. The optical splitter stacking system includes a latching mechanism at the third side wall.

The first and second side connection members each include a rigid wall member having a first end and a second end, the first end at least partially defining a slot extending along a portion of the corresponding first side wall or the second side wall, and the second end including a tab projecting from the rigid wall member. The connection members are configured to slidingly engage with corresponding connection members on an additional instance of the optical splitter housing, to form a stacked arrangement of optical splitter housings. The latching mechanism is configured to removably engage an additional instance of the latching mechanism on an additional instance of the optical splitter housing to selectively stop sliding disengagement of the optical splitter housing from an additional instance of the optical splitter housing.

Implementations of the optical splitter stacking system may also include one or more of the following features. The latching mechanism may include a latch tab and a strike tab spaced apart from the latch tab. The latch tab may be configured to slidingly and removably engage the strike tab on a corresponding additional latching mechanism in a first connection configuration. The strike tab may be configured to slidingly and removably engage the latch tab on an additional latching mechanism in a second connection configuration. The latch tab may include a protrusion that engages the strike tab of an additional latching mechanism. The latch tab may include a flexible material that enables deflection of the latch tab and the protrusion relative to the strike tab of an additional latching mechanism. Each of the connection members may include an outer wall member that forms part of the respective slot, the outer wall member including a notch configured to receive the tab of a respective additional connection member of the additional optical splitter housing.

Optical splitter stacking system implementations may also include one or more of the following features. The first end of the rigid wall member of each connection member may be configured to mate with a second end of a rigid wall member of an additional connection member on an additional optical splitter housing. The first end of the rigid wall member of the additional connection member may be configured to mate with the second end of the rigid wall member of each connection member. Mating of the ends of the rigid wall members can support the stacking of the cable splitter module and the additional cable splitter module along the stacking axis.

Implementations of the splitter stacking system may also include one or more of the following features. The optical splitter stacking system may include an optical splitter assembly positioned within the optical splitter storage area. A plurality of fiber leads may be connected to the optical splitter assembly. A plurality of cable assemblies may be included. Each cable assembly may be connected to one of the fiber leads. Each cable assembly may extend outside the housing through one of the cable ports. Each cable assembly may be terminated outside the housing by an optical fiber connection member. The optical splitter stacking system can include a plurality of cable adapters mounted within the plurality of cable ports for connecting fiber leads of an optical splitter assembly inside the housing.

Another general aspect includes a method for arranging optical splitter modules. The method includes positioning a first optical splitter module next to a second optical splitter module. Each of the first and second optical splitter modules includes an enclosure housing an optical splitter assembly. Each of the first and second optical splitter modules also includes a plurality of connection members including a linear arrangement of first side connection members located along a first side of the enclosure and a linear arrangement of second side connection members located along a second side of the enclosure. Each of the first and second optical splitter modules includes a plurality of cable ports providing access to the optical splitter assembly for a plurality of optical fiber cables.

The method includes slidingly engaging the first optical splitter module with the second optical splitter module. Slidingly engaging the first optical splitter module with the second optical splitter module includes inserting a tab on each connection member on the first optical splitter module into a slot of each connection member on the second optical splitter module. Slidingly engaging the first optical splitter module with the second optical splitter module includes sliding each tab within each respect slot, the sliding occurring parallel to the linear arrangements of first side and second side connection members, thereby sliding the first and second optical splitter modules together into a stacked arrangement. The method also includes latching the first optical splitter module to the second optical splitter module to selectively prevent the optical splitter modules from sliding apart. Latching includes engaging a single latch tab on the first optical splitter module with a single strike tab on the second optical splitter module.

Implementations of the method for arranging optical splitter modules may include one or more of the following features. For example, the method can include the locking engagement of the single latch tab and the single strike tab to lock the first and second optical splitter modules together in the stacked arrangement.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

Aspects may be more completely understood in connection with the following drawings.

FIG. 1B is a second perspective view of the splitter module of FIG. 1A.

FIG. 3 is a perspective view of a stack of multiple instances of the splitter module of FIG. 1A.

FIG. 4 is a first partial perspective view of an embodiment of a splitter module illustrating a connection member.

FIG. 5 is a second partial perspective view of the splitter module of FIG. 4.

FIG. 14 is a side view of an embodiment of a lockable splitter module.

Figure 1A:
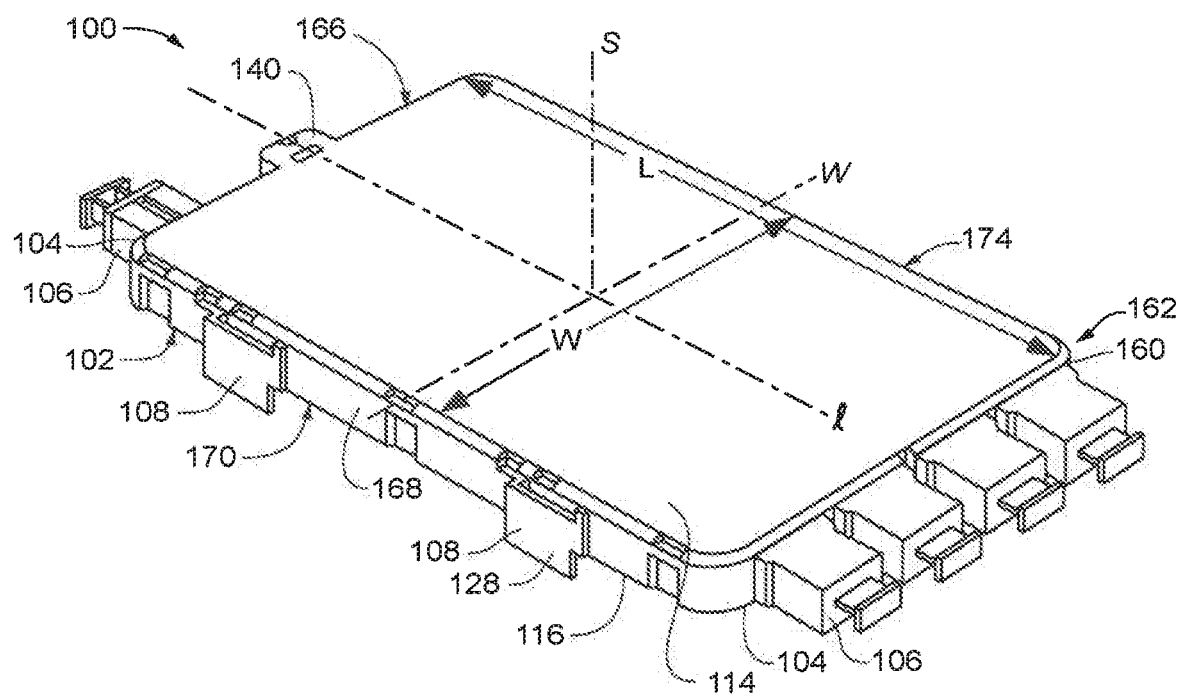
FIG. 1A is a first perspective view of an embodiment of a splitter module.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION OF EMBODIMENTS

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated herein by reference. The publications and patents disclosed herein are provided solely for their disclosure. Nothing herein is to be construed as an admission that the inventors are not entitled to antedate any publication and/or patent, including any publication and/or patent cited herein.

Many existing systems for mounting optical splitter modules (e.g., optical splitter cassettes) provide a fixed framework or brackets for support, such as a rack structure designed to accept up to a certain number of splitter modules. Such systems lack modularity and require a fixed amount of space, regardless of the number of modules actually present in the system. Disclosed herein are examples of stackable splitter modules having stackable mounting features that allow the modules to be stacked together and interconnected without additional hardware. The stackable splitter modules do not require a pre-existing, traditional framework, and thus are fully modular and require only a certain amount of space corresponding with a desired number of modules being installed. In some cases a base or mounting plate provides an initial, stable platform for a mounting an initial splitter module. Additional adjacent splitter modules can then be stacked upon the initial splitter module. A base can be a standalone structure, or can be integrated into a cabinet, enclosure, pedestal, or other structure where a stack of one or more splitter modules is desired.

Optionally, in some implementations all of the splitter modules in a particular arrangement have identical housings and mounting features, thus providing a simpler manufacturing design and making it easy to interchange splitter modules during installation. A single cable splitter module design can provide a housing with one or more mounting features that enables multiple cable splitter modules, having the same design, to be connected together, one next to another, in a modular stack. This design can provide a modularity that is adaptable to multiple different configurations of splitter modules. Accordingly, one possible benefit is that complex mounting hardware is unneeded.

In some cases mounting features may include multiple rigid interlocking walls and relief areas on adjacent modules that advantageously restrict movement of the splitter modules to a single direction or axis. Some implementations may include one or more connection members having mounting features. For example, in some cases a splitter module may have one connection member that engages a single connection member on an adjacent splitter module. In another example, in some cases four connection members, each including interlocking walls and relief areas, are provided on each splitter module.

In some cases connection members include mounting features such as slots that accept tabs of an adjacent splitter module. The tabs and slots provide a method of interconnection that enables the creation of a stack of any number of splitter modules, subject to space limitations. For example, an implementation includes a module with four tabs that are received in four slots of an adjacent module.

In some implementations the interlocking features restrict movement of adjacent splitter modules along a stacking axis and a width axis, but may allow some movement along a longitudinal axis. In some cases only a single additional point of contact is needed to further restrict movement along the axis of movement. For example, some embodiments include a single latch point for engaging adjacent splitter modules. A single engagement point can be advantageous in some cases in that it allows manual engagement and disengagement of adjacent modules with only one hand, rather than needing two hands to simultaneously engage or disengage multiple latch points.

In some cases a latching mechanism inhibits relative movement between adjacent splitter modules without necessarily locking the modules together. For example, a flexible latch tab on the end of a module can hold the module relative to another adjacent module, while the sliding engagement of wall members, incorporating slots and tabs with adjacent wall members, restricts movement in other directions. In some cases the latching mechanism may also lock, or a separate locking mechanism is provided to separately lock movement of adjacent splitter modules.

In some cases a splitter housing having a modular design provides an enclosure for an optical splitter assembly. Flexible fiber leads can be included with the module to put the splitter assembly in communication with cable adapters provided on the housing. The cable adapters can be used to mate with fiber connectors and put the splitters in communication with external fibers. The splitter housing can be configured for installation indoors in a secure area or outdoors when enclosed within a secure and weathertight enclosure. In some examples, the splitter housing itself can be weathertight. For example, the cable adapters can be hardened and configured to mate with hardened connectors. Weathertight splitter housings can be configured for installation indoors in unsecured areas or outdoors on walls, poles, pedestals, vaults, or other locations absent a weatherproof enclosure for installing modules.

In some cases a splitter housing having a modular design provides an enclosure for an optical splitter assembly. Flexible fiber leads can be included with the module to put the splitter assembly in communication with more rugged cable assemblies that extend to the exterior of the housing. The rugged cable assemblies can include adaptors for mating with corresponding connectors. The adaptors can be configured to put the splitters in communication with external fibers. The splitter housing can also include a splice storage area for housing splice connections between the flexible fiber leads and rugged cable assemblies. The splitter housing can also provide a strain-relieving structure for protecting the rugged cable assemblies from damage due to pulling or twisting. The splitter housing can be configured for installation indoors in a secure area or outdoors when enclosed within a secure and weathertight enclosure. In some examples, the splitter housing can be weathertight. For example, the rugged cable assemblies and cable adapters can be hardened and configured to mate with hardened connectors. Weathertight splitter housings can be configured for installation indoors in unsecured areas our outdoors on walls, poles, pedestals, vaults, or other locations absent a weatherproof enclosure for installing modules.

An optical splitter module is generally a structure including optical fiber hardware. Such a splitter module can be used where a fiber optic cassette, module, tray, or other discrete structure is used in an optical fiber network. According to some implementations described herein, a splitter module is configured to be arranged in a stack or other array with other like splitter modules, and may thus be referred to as a stackable splitter module. A stackable splitter module is generally configured to connect with other stackable splitter modules to form a self-supporting stack or array of splitter modules without a traditional frame or other external support, apart from a base, mounting plate, or other initial mounting area.

A stackable splitter module generally includes a structure for connecting to another object, such as one or more adjacent stackable splitter modules. A stackable splitter module can be connectable to adjacent instances of like or identical stackable splitter modules. A stackable splitter module can be connectible such that it can form a stack of connected stackable splitter modules along a stacking axis. A splitter module can have such a modular connectivity by way of a connection structure configured to connect to adjacent connection structures on adjacent splitter modules. Such a connection structure can include one or more regions of a splitter module that directly connect to other splitter modules without requiring an external frame or support. In some embodiments, the connection structure of a splitter module is configured to removably couple adjacent splitter modules. The connection structure can form a rigid connection between adjacent splitter modules and form a rigid stack of one or more splitter modules. The connection structure can be configured to couple a splitter module to a terminal, base plate, or other structure configured to receive a splitter module. As will be discussed, in some implementations the connection structure includes one or more connection members.

Referring now to FIGS. 1A and 1B, first and second perspective views are shown of a splitter module 100 in accordance with various embodiments herein. The splitter module 100 can include one or more connection members 108 that compose some or all of the connection structure of a splitter module 100. The connection members 108 are configured to couple with one or more adjacent splitter modules or another structure. A connection member 108 can include a structure for receiving a connection member of an adjacent splitter module. The connection member 108 can also include a structure configured to be received by the connection member of an adjacent splitter module. In some cases the connection member 108 can be configured to be received by an adjacent mounting structure. The connection member 108 can be configured to receive an adjacent mounting structure.

The splitter module 100 is depicted along with a reference coordinate system including a stacking axis s, a longitudinal axis 1, and a width axis w. The splitter module 100 can define a housing 102. The housing 102 can have a length L extending along the longitudinal axis 1. The splitter module 100 can have a width W extending transverse to the longitudinal axis 1 and along the width axis w. The stacking axis is perpendicular to the longitudinal axis 1 and perpendicular to the width axis w.

The connection members 108 can be configured to couple to the connection members of adjacent splitter modules such that side-to-side movement of the cable splitter module and the adjacent cable splitter module in a direction of the width axis w is restricted. The connection members 108 can be configured to couple to the connection members of adjacent splitter modules such that relative vertical movement of the cable splitter module and the adjacent cable splitter module along the stacking axis s is restricted. In some cases, the connection members are configured to fully restrain adjacent splitter modules from moving relative to each other. In some implementations, the connection members are configured to partially restrain adjacent splitter modules from moving relative to each other. FIG. 3 shows an exemplary stack of splitter modules 100 having relative motion at least partially restricted by the connection members 108 such as those described herein.

In some implementations, a splitter module includes a latching mechanism. A latching mechanism can be included on a splitter module to remove one or more degrees of freedom between a splitter module and structure connected thereto, such as an adjacent splitter module. In some embodiments, the latching mechanism removes one degree of freedom. In some embodiments, the latching mechanism acts with the connection members to fully constrain a splitter module and a structure connected thereto.

Referring again to FIGS. 1A and 1B, the splitter module 100 includes one possible example of an optional latching mechanism 140. The latching mechanism 140 is employed to remove translational freedom between the splitter module 100 and another structure in a longitudinal direction parallel to the longitudinal axis 1. In some implementations, the latching mechanism 140 is at the second end of the housing 166 as shown in FIGS. 1A-1B. Other locations for the latching mechanism 140 are also possible, including at the first end 162 of the housing. Various aspects of latching mechanisms will be discussed further herein.

Implementations of stackable splitters as discussed herein include a housing that defines a top planar wall and a bottom planar wall. A top planar wall can be parallel to and opposite a bottom planar wall. A top planar wall and a bottom planar wall can define top and bottom surfaces of a splitter module. Components housed or otherwise carried by a splitter module, such as an optical splitter, can be located between a top planar wall and a bottom planar wall. A storage area can be defined between a top planar wall and a bottom planar wall. The housing of a splitter module can also define a first end wall at a first end and a second end wall at a second end, which may be opposite the first end of the housing. The housing of a splitter module can define a first side wall at a first side. The housing of a splitter module can define a second side wall at a second side. The second side of a housing can be opposite the first side of the housing.

FIGS. 1A and 1B depict the stackable splitter module 100 having a housing 102 defining a top planar wall 114 and a bottom planar wall 116. The top planar wall 114 is parallel to and opposite the bottom planar wall 116. A storage area is defined between the top planar wall 114 and the bottom planar wall 116. The housing 102 further defines a first end wall 160 at a first end 162 and a second end wall 164 at a second end 166 opposite the first end 162 of the housing 102. The housing 102 of the splitter module 100 defines a first side wall 168 at a first side 170 and a second side wall 172 at a second side 174 opposite the first side 170 of the housing 102.

In some implementations, a stackable splitter module includes a plurality of connection members. The connection members can be arranged in a variety of manners. In some cases multiple connection members are arranged on the first side of a housing as first side connection members. A plurality of connection members can also be arranged on the second side of the housing as second side connection members. In some cases, a housing includes two first side connection members at the first side. In some cases, a housing includes two second side connection member at the second side. In some cases, a housing includes a first side connection member and a corresponding second side connection member, the first side connection member and the second side connection member forming a first connection member pair. In some cases, a housing includes a second connection member pair, the second connection member pair including a first connection member and a corresponding second connection member. In some cases, a housing includes more than two connection member pairs, each connection member pair including a first connection member and a second connection member.

As shown in FIGS. 1A-1B, in the depicted implementation the housing 102 has a plurality of connection members 108 that are arranged as first side connection members 128 and second side connection members 138. The housing 102 includes two first side connection members 128 at the first side 170. The housing 102 also includes two second side connection members 138 at the second side 174. The housing 102 includes a first side connection member 128 and a corresponding second side connection member 138, the first side connection member 128 and the second side connection member 138 forming a first connection member pair. The housing 102 also includes a second connection member pair, the second connection member pair including a first connection member 128 and a second connection member 138.

According to some implementations, a stackable splitter housing can include multiple connection members that make up a linear arrangement of first side connection members and a linear arrangement of second side connection members. In some cases, the first side of a housing is a first side wall having a linear arrangement of first side connection members. In some cases, the second side of a housing is a second side wall having a linear arrangement of second side connection members. In some cases, a second end of a housing defines a third side wall with a cable port providing access to an optical splitter storage area. In some cases, a first end of a housing defines a fourth side wall having a multiple cable ports providing access to the optical splitter storage area.

According to the example in FIGS. 1A-1B, the housing 102 includes a plurality of connection members 108 comprising a linear arrangement of first side connection members 128 and a linear arrangement of second side connection members 138. In the housing 102 of the splitter module 100 depicted in FIGS. 1A and 1B, the first side 170 is a first side wall comprising a linear arrangement of first side connection members 128. The second side 174 is a second side wall comprising a linear arrangement of second side connection members 138. The second end 166 defines a third side wall comprising a cable port 104 providing access to the optical splitter storage area provided by the housing 102. The first end 162 defines a fourth side wall comprising a plurality of cable ports 104 providing access to the optical splitter storage area.

In some implementations a splitter module can include one or more cable ports for receiving communication cables, such as optical fiber cables or electrical transmission cables. Cable ports generally provide access to the interior of a splitter module. A cable port can be a passage through one or more walls of a splitter module. Cable ports can receive input or output cables. Cable ports can have cable adapters mounted there-within. Cable adapters can be configured to receive communication cables. Cable adapters can be configured to receive connectorized communication cables. Various types of adapters can be used, as will be described further below herein.

The splitter module 100 in FIGS. 1A-1B includes a plurality of ports 104 for receiving communication cables. The ports 104 provide access to the interior of the splitter module 100. The ports 104 are passages through the end walls of the housing 102 of the splitter module 100. The cable ports 104 can receive input or output cables. The cable ports 104 have cable adapters 106 mounted there-within. The cable adapters 106 are configured to receive communication cables, such as connectorized communication cables.

Figure 2:
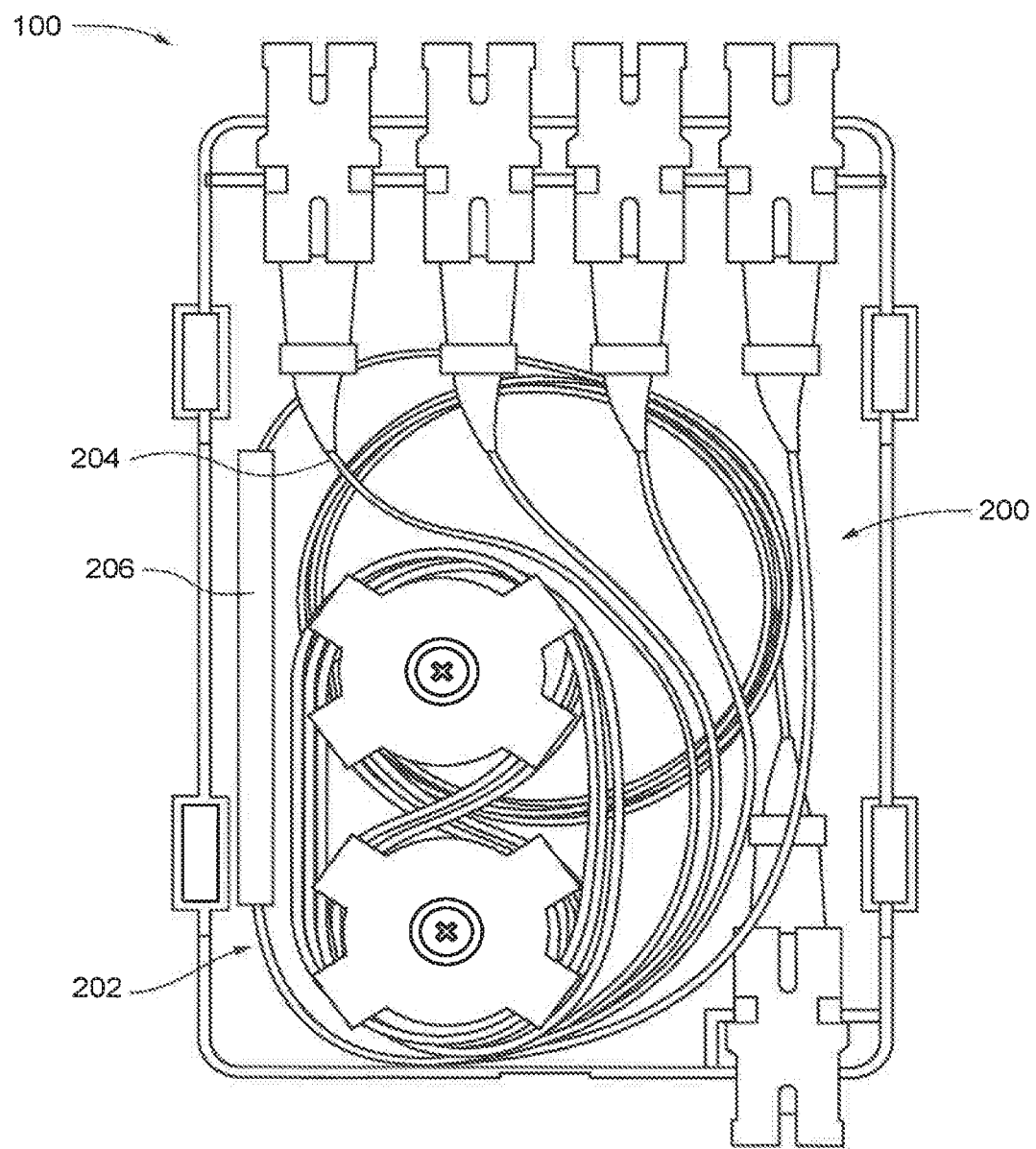
FIG. 2 is a top view of the interior of the splitter module of FIG. 1A.

Referring now to FIG. 2, a top view is shown of the interior of the splitter module 100 in accordance with various implementations. As depicted, the splitter module 100 defines an optical splitter storage area 200. An optical splitter storage area is generally a region configured to contain various communication components, which will be described further herein below. In the exemplary splitter module 100 depicted in FIG. 2, an optical splitter assembly 202 is positioned within the optical splitter storage area 200.

An optical splitter assembly can be connected to a plurality of leads. Leads are generally segments of communication cable, such as optical fiber cable. Leads can be connected one or more cable adapters mounted in the one or more cable ports. Each cable port present on a splitter module can provide access to one of the fiber leads. Fiber leads can be terminated inside a splitter module housing by an optical fiber connection member configured to connect with a cable adapter. Alternatively, fiber leads can be terminated outside the housing of a splitter module by ruggedized cables.

Referring to FIGS. 1A, 1B, and 2, the optical splitter assembly 202 is connected to a plurality of leads 204. The leads 204 include be segments of communication cable. The plurality of leads are connected to the cable adapters 106 mounted in the cable ports 104. Each of the cable ports 104 provides access to one of the fiber leads 204. Each of the fiber leads 204 is terminated inside the housing 102 by an optical fiber connection member configured to connect with one of the cable adapters 106.

In other implementations fiber leads are terminated outside a splitter housing by way of cable assemblies. Each cable assembly can be connected to a fiber leads. Each cable assembly can extend outside the housing through one of the cable ports. Each cable assembly can be terminated outside the housing by an optical fiber connection member. In some cases, a cable splitter module includes an optical splitter assembly positioned within the optical splitter storage area, a plurality of fiber leads connected to the optical splitter assembly, and a plurality of cable assemblies, wherein each cable assembly is connected to one of the fiber leads, wherein each cable assembly extends outside the housing through one of the cable ports, and wherein each cable assembly is terminated outside the housing by an optical fiber connection member. Examples including cable assemblies will be discussed further herein.

FIG. 3 shows a perspective view of a stack of connected splitter modules in accordance with various implementations. The splitter modules can be consistent with those described above with reference to FIGS. 1A-2. The splitter modules shown in FIG. 3 are configured as a vertical stack. The splitter modules are stacked vertically along a stacking axis s. specifically, a bottom splitter module 301 is coupled to a middle splitter module 302. The middle splitter module 302 is coupled to the bottom splitter module 301 and to a top splitter module 303.

In some cases stackable splitter modules can be configured such that relative motion between splitter modules is restricted when configured as a stack. In some cases, a splitter module has zero degrees of freedom when in a stacked configuration. In some cases, relative motion between splitter modules is restricted by connection members. In some cases, relative motion between splitter modules is restricted by one or more latching mechanism. In some cases, splitter modules can be assembled into a stack without requiring tools.

Turning back to FIG. 3, the splitter modules 301, 302, 303 are coupled to each other by way of connection members 108. The splitter modules can be further coupled by way of latching mechanisms 140. In the configuration depicted by FIG. 3, the connection members 108 of the top splitter module 303 are received by the connection members 108 of the middle splitter module 302. The connection members 108 of the middle splitter module 302 are received by the connection members of the bottom splitter module 301.

As described above, in some cases a connection member is configured to couple to adjacent connection members of adjacent splitter modules. In some implementations, a connection member of a first splitter module is configured to couple to the connection member of an adjacent splitter module positioned above the first splitter module. In such cases, the first splitter module is in a second connection configuration. In some cases the connection member of a first splitter module is configured to couple to the connection member of an adjacent splitter module positioned below the first splitter module. In such cases, the first splitter module is in a first connection configuration. In some cases a connection member of a first splitter module is configured to couple to the connection member of an adjacent splitter module positioned above the first splitter module and to the connection member of an adjacent splitter module positioned below the first splitter module. The stack of splitter modules 301, 302, 303 shown in FIG. 3 exemplifies at least some such configurations.

In some cases a connection member can define an interlocking structure with one or more adjacent connection members. A connection member can include structure to engage with structure of adjacent connection members by overlapping or by the fitting together of the structures. A connection member can include projections and recesses, the projections configured to engage the recesses of adjacent modules or of another mounting structure. A connection member can define feet configured to connect to adjacent splitter modules or another coupling structure. A connection member can include a tab and a slot, the tab configured to engage the slot of an adjacent connection member of an adjacent splitter module.

Referring now to FIGS. 4 and 5, partial perspective views of the splitter module 100 are depicted. FIG. 4 shows a corner of the splitter module 100 from a top perspective view and depicts one of the connection members 108. FIG. 5 shows a bottom perspective view of the splitter module 100, and depicts another view of the connection member 108. The connection member 108 can have a rigid wall member 400. The rigid wall member 400 has a first end 402 and a second end 404. In some cases, the first end 402 of the rigid wall member 400 of the connection member 108 is configured to mate with the second end of the rigid wall member of an adjacent connection member. In some such implementations, the first end of the rigid wall member of the adjacent connection member is configured to mate with the second end of the rigid wall member of the connection member. Mating of the ends of the rigid wall members supports the stacking of the cable splitter module and the adjacent cable splitter module along the stacking axis.

The first end 402 can include one or more tabs 500. The tabs 500 project from the rigid wall member 400. The second end 404 can include a slot 406. The slot 406 extends substantially parallel to the longitudinal axis 1 of the housing. The tabs 500 of the connection member 108 are configured to engage a slot of an adjacent splitter module. In some embodiments, the tabs 500 are configured to slidingly engage the slot of an adjacent splitter module. The slot 406 of the connection member 108 is configured to engage the one or more tabs of an adjacent splitter module. In some embodiments, the slot 406 is configured to slidingly engage the one or more tabs of an adjacent splitter module. The connection member 108 can include an outer wall member 408 that forms part of the slot 406. The outer wall member 408 can define one or more notches 410. The notches 410 can be configured to selectively receive a tab of an adjacent connection member. The notches 410 can provide a passage for the tabs 500 to access the slot 406.

Adjacent connection members of adjacent splitter modules can be slidingly engaged by inserting a tab on each connection member on the first optical splitter module into a slot of each connection member on the second optical splitter module. Once inserted, the sliding of each tab within each respective slot is performed. The sliding can occur parallel to the linear arrangements of first side and second side connection members. Such sliding of first and second optical splitter modules slidingly engages the modules into a stacked arrangement.

The splitter module 100 partially depicted in FIGS. 4 and 5 has a connection member 108 including an outer wall member 408 that defines two notches 410, although various implementations consistent with the technology disclosed herein can include one notch or greater than two notches. Similarly, the splitter module 100 depicted in FIGS. 4-5 has a connection member 108 including a rigid wall member 400 defining two tabs, although various implementations consistent with the technology disclosed herein can include one tab or more than two tabs. In some cases the number of notches defined by a connection member is equal to the number of tabs defined by the connection member.

Figure 6A:
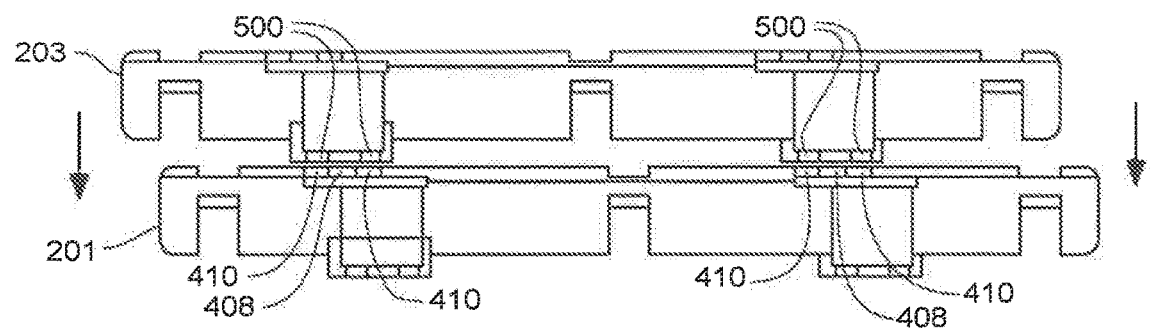
FIG. 6A-6C are schematic side views of some steps for connecting adjacent splitter modules in an embodiment.
Figure 6B:
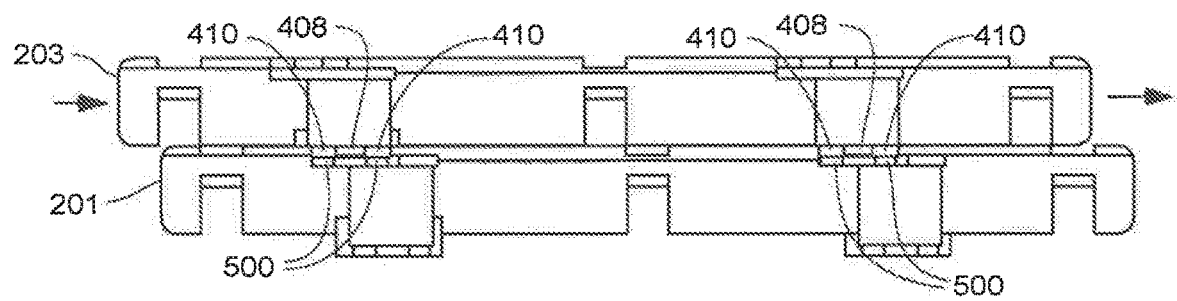
Figure 6C:
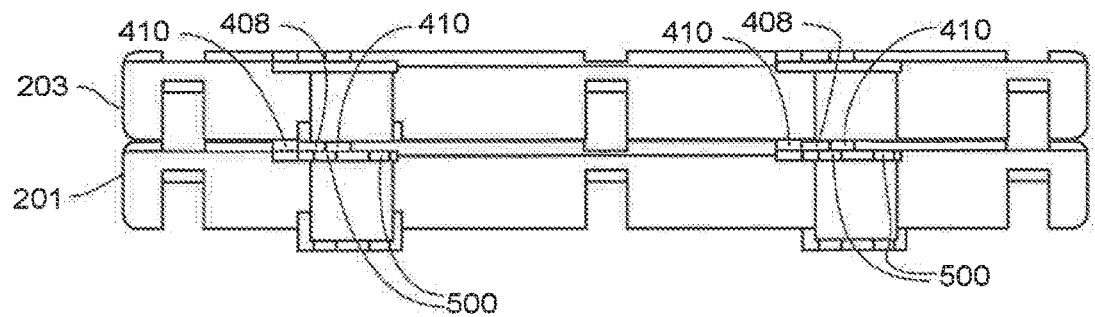

The tabs 500, the outer wall member 408, and the rigid wall 400 are configured to provide an interlocking structure. FIGS. 6A-6C show schematic side views illustrating certain steps for connecting adjacent splitter modules via sliding engagement of adjacent connection members. Shown are a top splitter module 203 and a bottom splitter module 201 coupling to form a stack of two splitter modules. The splitter modules 100 are modular and can thus form stacks of greater than two splitter modules. The top splitter module 203 can couple to an adjacent splitter module there-above. Similarly, the bottom splitter module 201 can couple to an adjacent splitter module there-below. In some cases, stacks of adjacent splitter modules are composed of modules having substantially identical housings. In some cases, stacks of adjacent splitter modules are formed by modules having compatible connection members or other connecting structures. Thus the number of splitter modules in a stack consistent with the technology herein is not limited. The modularity of the splitter modules enables users to provide stacks of modules using a particular number of modules that is suitable for a particular use.

FIG. 6A shows a top splitter module 203 and a bottom splitter module 201. The top splitter module 203 and the bottom splitter module 201 are positioned such that the notches 410 of the bottom splitter module 201 are aligned with the tabs 500 of the top splitter module 203. The notches 410 of the top splitter module 203 can be inserted into the slots 406 by downwardly moving the notches 410 through the notches 410.

FIG. 6B shows the top splitter module 203 partially coupled to the bottom splitter module 201. The tabs 500 of the top splitter module 203 are inserted into the slots 406 of the bottom module 201. The connection members 108 of the top splitter module 203 are partially engaged with the connection members 108 of the bottom splitter module 201 in this state. In this state, relative transverse or lateral motion between the top splitter module 203 and the bottom splitter module 201 is restricted, but the modules are not fully constrained. The top module 203 and bottom module 201 can be fully engaged or interlocked by slidingly moving the top module 203 in a longitudinal direction parallel to the linear arrangements of connection members (depicted by the arrows).

FIG. 6C shows the top splitter module 203 coupled to the bottom splitter module 201. The tabs 500 of the top splitter module 203 are inserted into the slots 406 of the bottom module. The connection members 108 of the top splitter module 203 are engaged with the connection members 108 of the bottom splitter module 201 in this configuration. In this configuration, the tabs 500 of the top splitter module are constrained by the connecting member 108 of the bottom splitter module 201. Relative motion between the top splitter module 203 and the bottom splitter module 201 is restricted. In some implementations, relative side-to-side movement between the top splitter module 203 and the bottom splitter module 201 in a direction of a width axis is restricted. In some embodiments, relative vertical movement of the top splitter module 203 and the bottom splitter module 201 along the stacking axis s is restricted. The coupling structures of the top splitter module 203 and the bottom splitter module 201 can provide zero degrees of freedom, one degree of freedom, or more than one degree of freedom. In some cases, the coupling structures of adjacent modules allow at least some longitudinal translation between the modules, and a latching mechanism is employed to fully constrain adjacent modules.

Figure 7:
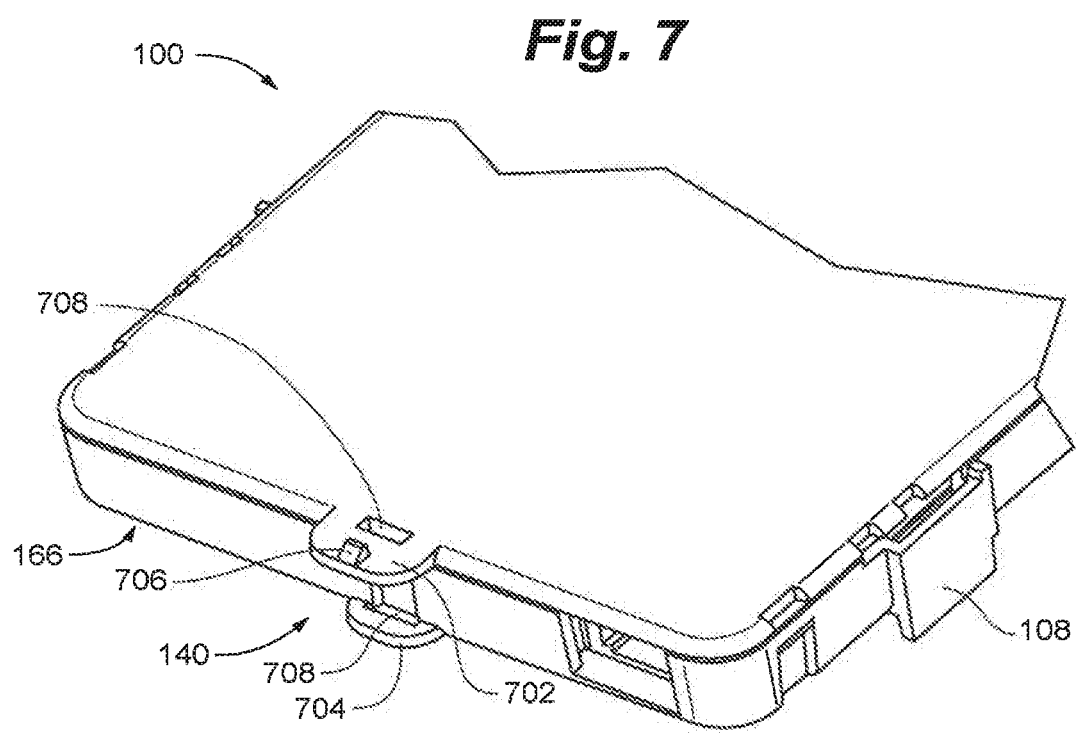
FIG. 7 is a partial perspective view of an embodiment of a splitter module illustrating a latching mechanism.

FIG. 7 is a partial perspective view of the splitter module 100 illustrating a latching mechanism 700 in accordance with some implementations for coupling to adjacent splitter modules. As described above with reference to FIGS. 6A-6C, adjacent splitter modules can be assembled by engaging adjacent coupling members, but in some cases, this leaves adjacent splitter module with at least one degree of freedom in a longitudinal direction. The latching mechanism 700 can be configured to remove this one or more degrees of freedom and fully constrain adjacent splitter modules. The latching mechanism 140 is configured to removably engage an adjacent latching mechanism of an adjacent splitter module. Engagement of adjacent latching mechanisms stops sliding disengagement of the cable splitter module 100 and an adjacent cable splitter module. The latching mechanism 140 can be configured to removable engage a second adjacent splitter module.

In some cases a latching mechanism is a structure that provides a snap-fit connection with an adjacent splitter module. The latching mechanism 140 shown in FIG. 7 is an example of a snap-fit latching mechanism. The locking mechanism 140 includes a latch tab 702. The latch tab 702 defines a protrusion 706. The latching mechanism has a strike tab 704. The latch tab 702 is spaced apart from the strike tab 704. The latch tab 702 is configured to slidingly and removably engage the strike tab of a corresponding latching mechanism on an adjacent splitter module. The strike tab 704 is configured to slidingly and removably engage the latch tab of a corresponding latching mechanism on an adjacent splitter module.

In some implementations, a latching mechanism further provides a structure for locking adjacent splitter modules together. A locking mechanism can be configured to selectively lock the latching mechanism to prevent disengagement of a cable splitter module from an adjacent cable splitter module. Such locking functionality can be implemented to prevent unauthorized de-coupling of adjacent splitter modules. The splitter module 100 in FIG. 7 includes features corresponding to one example of a locking mechanism. As is shown, the latching mechanism 140 includes passages 708. The passages 708 are configured to accept a locking mechanism, as will be described further herein.

Figure 8A:
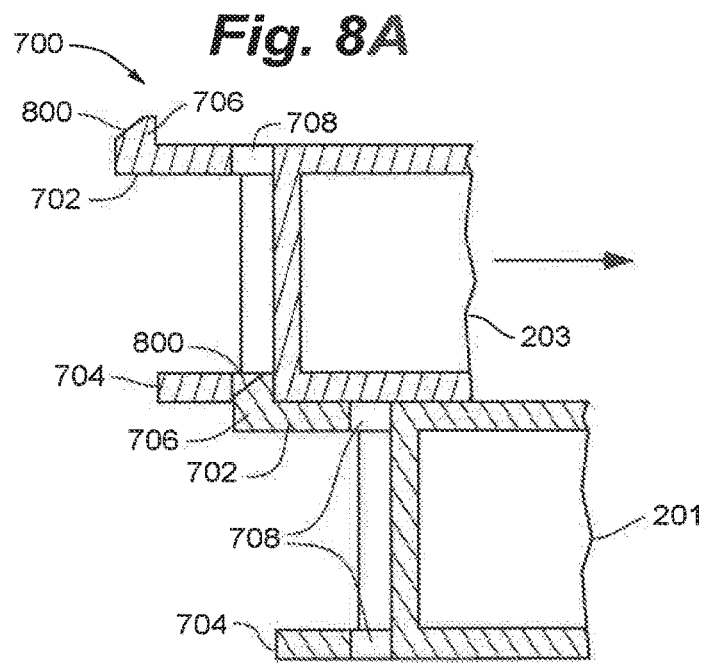
FIGS. 8A-8C are cross-sectional side views of some steps for latching adjacent splitter modules in an embodiment.
Figure 8B:
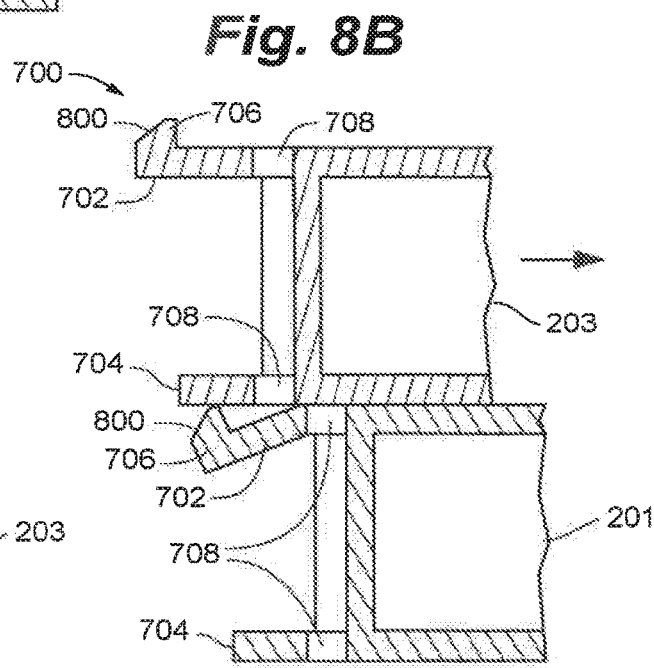
Figure 8C:
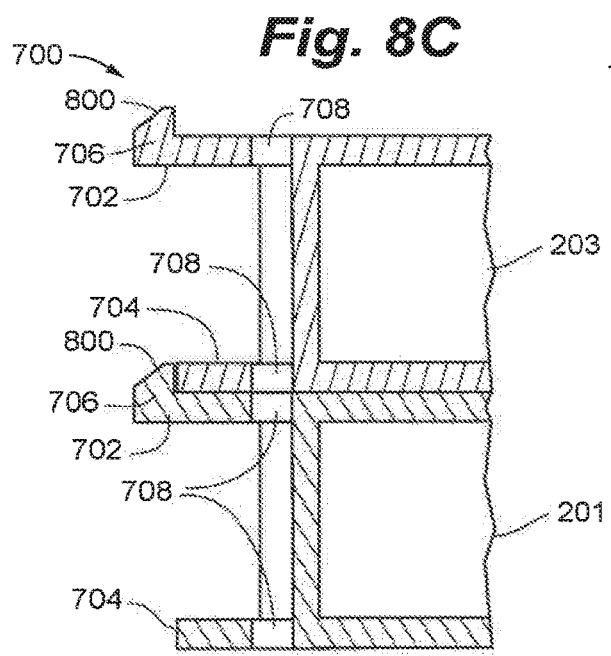

FIGS. 8A-8C are cross-sectional side views of some steps for latching adjacent splitter modules according to an example. The adjacent splitter modules are a top splitter module 203 and a bottom splitter module 201. With reference to each other, the latching mechanism 140 of the top splitter module 203 and the latching mechanism of the bottom splitter module 201 are adjacent instances of a latching mechanism. The latching mechanism 140 of the top splitter module 203 is configured to removably engage the latching mechanism 140 of the bottom splitter module 201. The latching mechanism 140 of the top splitter module 203 is further configured to removably engage the latching mechanism of an adjacent splitter module above the top splitter module 203 (not shown in FIGS. 8A-8C). The latching mechanism 140 of the bottom splitter module 201 is configured to removably engage the latching mechanism 140 of the top splitter module 203. The latching mechanism 140 of the bottom splitter module 201 is further configured to removably engage the latching mechanism of an adjacent splitter module below the bottom splitter module 201 (not shown in FIGS. 8A-8C).

FIG. 8A shows the latching mechanism 140 of the top splitter module 203 and the latching mechanism 140 of the bottom splitter module 201 in a disengaged configuration. The top splitter module 203 and the bottom splitter module 201 are longitudinally offset. In such a configuration, the connection members of the top splitter module 203 and bottom splitter module 201 are not fully engaged. The protrusion 706 can fit at least partially within a passage 708 so that the latch tab 702 is relaxed in this initial configuration. The top splitter module 203 and the bottom splitter module 201 can be engaged by sliding one splitter module relative to the other in a direction parallel to the longitudinal axis of the splitter modules (shown by the arrow). An angled surface 800 on the protrusion 706 can urge the protrusion 706 out of the passage 708 and away from the strike tab 704 as sliding occurs.

FIG. 8B shows the top splitter module 203 as it is slid in a longitudinal direction with respect to the bottom splitter module 201. The latch tab 702 of the bottom splitter module 201 is flexible and deflects as the top splitter module 203 is slid. The deflection of the bottom latch tab enables the protrusion 706 of the bottom splitter module 201 to clear the strike tab of the top splitter module 203. The latch tab 702 is resilient, and is configured to resiliently engage with the strike tab 704.

FIG. 8C shows the latching mechanism 140 of the top splitter module 203 and the latching mechanism 140 of the bottom splitter module 201 in an engaged configuration. The top splitter module 203 and the bottom splitter module 201 are longitudinally aligned. In such a configuration, the connection members of the top splitter module 203 and bottom splitter module 201 are fully engaged. The protrusion 706 of the bottom splitter module 201 is engaged with the strike tab 704 of the top splitter module 203.

In the engaged configuration, the latching mechanism 140 of the top splitter module 203 and the latching mechanism 140 of the bottom splitter module 201 substantially restrict relative motion between the top splitter module 203 and the bottom splitter module 201. The latching mechanisms can be disengaged by resiliently flexing the latch tab 702 away from the strike tab 706 and contemporaneously sliding the splitter modules away from each other longitudinally. In some cases, disengaging the latching mechanisms can be performed manually without tools. In addition, in some cases the latching mechanisms can be disengaged manually with a single hand, thus making it easier for a technician to disengage adjacent splitter modules at a single point of contact, rather than requiring disengagement at two or more points of contact.

The passages 708 of the top and bottom latching mechanisms 140 are aligned when the latching mechanisms 140 are engaged. The passages 708 can receive a locking mechanism. For example, in some implementations a locking mechanism can include a key configured to be inserted through the passages 708 to prohibit the disengagement of the latching mechanisms 140. Such a locking mechanism can thus prevent the sliding disengagement of adjacent splitter modules.

In some implementations of a stackable splitter module, a base or mounting plate is provided and configured to receive and couple to a first splitter module. A base can be used to provide a stable platform for a stack of one or more splitter modules. A base can be a standalone structure, or can be integrated into a cabinet, enclosure, pedestal, or other structure where a stack of one or more splitter modules is desired. A base can be defined by recesses on any internal surface of an enclosure. In some embodiments, a base plate is configured to receive more than one stacks of one or more splitter modules.

Figure 9:
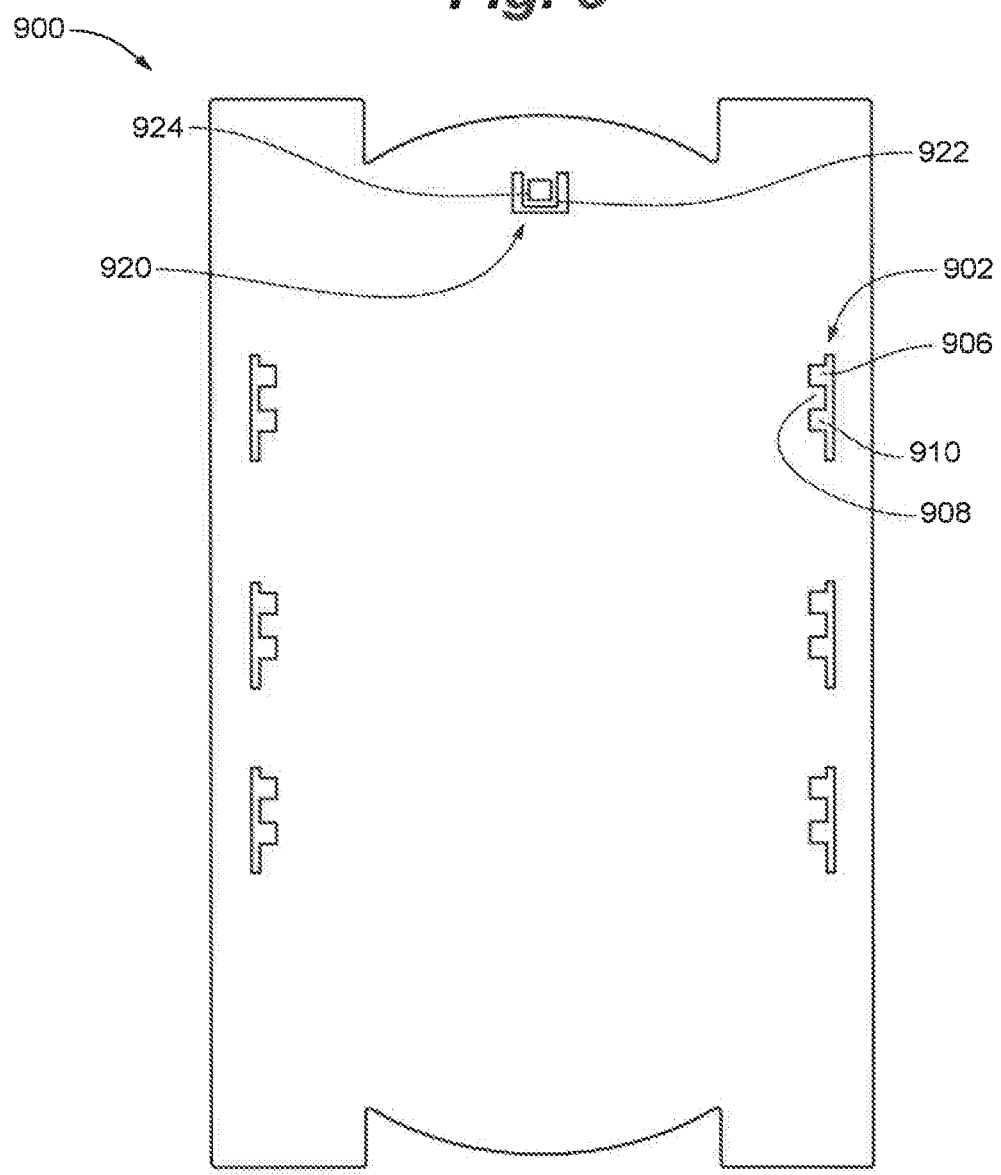
FIG. 9 is a top view of an embodiment of a splitter module base.

Referring now to FIG. 9, a top view is shown of a splitter module base 900 in accordance with various implementations. The base 900 can be configured to slidingly engage with a splitter module. The base 900 is configured to receive the connection structure of a splitter module. The base 900 can be configured to receive and couple to one or more connection members of a splitter module. The base 900 can include connection receptacles 902. The connection receptacles 902 can be recesses defined by the base 900. Each connection receptacle 902 is configured to accept a connection member of a splitter module. The connection receptacles 902 can define a structure similar to the receiving structure defined by the connection members of splitter modules consistent with those described above with reference to the various connection members 108. Each connection receptacle 902 can form a rigid connection with an adjacent splitter modules and provide a base for a rigid stack of one or more splitter modules.

The connection receptacles 902 can be configured to couple to the connection members of one or more splitter modules such that side-to-side movement of the attached one or more splitter module on the base 900 in direction of a width axis is restricted. The connection receptacles 902 can be configured to couple to the connection members of one or more adjacent splitter modules such that relative vertical movement of the attached one or more splitter module on the base 900 in a stacking axis is restricted. In some embodiments, the connection receptacles 902 are configured to fully restrain splitter modules from moving relative to the base 900. In some embodiments, the connection receptacles 902 are configured to partially restrain splitter modules from moving relative to the base 900.

Each connection receptacle 902 can define an interlocking structure with one or more splitter module connection members, such as the various connection members 108 discussed herein. Each connection receptacle 902 can include structure to engage with structure of splitter module connection members by overlapping or by the fitting together of the structures. Each connection receptacle 902 can include recesses configured to engage the tabs of splitter modules.

The connection receptacles 902 can each define a slot 906. The slot 906 extends substantially parallel to a length of the base 900. The slot 906 is configured to engage the tabs of a splitter module connection member. In some embodiments, the slot 906 is configured to slidingly engage the tabs of a splitter module connection member. The base 900 can include a lip 908. The lip can define one or more notches 910. The notches 910 can be configured to selectively receive a tab of a splitter module connection member. The notches 910 provide a passage for the tabs of a splitter module connection member to access the slot 906. The tabs of a splitter module can be inserted into the slots 906 by passing through the notches 910. The tabs of a splitter module can be slidingly engaged with the slots 906. Splitter module connection members can be slidingly engaged with connection receptacles 902 by inserting a tab of each connection member on the splitter module into a slot 906 of each connection receptacle 902. Once inserted, the sliding of each tab within each respect slot is performed. The sliding occurs parallel to each slot 906. Such sliding of splitter modules slidingly engages the module into a coupled arrangement.

The base 900 depicted in FIG. 9 has a connection receptacle 902 having a lip 908 that defines two notches 910, although various embodiments consistent with the technology disclosed herein can include one notch or greater than two notches. Similarly, many of the various splitter module connection members depicted herein include two tabs, although various embodiments consistent with the technology disclosed herein can include one tab or more than two tabs. In some embodiments, the number of notches 910 defined by a connection receptacle 902 is equal to the number of tabs defined by connection member.

The base 900 can include a latching mechanism 920 for coupling to splitter modules. The latching mechanism 920 is configured to restrain a splitter module coupled to the base 900. The latching mechanism 920 is configured to remove one or more degrees of freedom and fully constrain splitter modules that are engaged with the base 900. The latching mechanism 920 is configured to removably engage an adjacent latching mechanism of a splitter module. Engagement of adjacent latching mechanisms stops sliding disengagement of a cable splitter module the base 900.

A latching mechanism can be a structure for providing a snap-fit connection with an adjacent splitter module. The latching mechanism 920 shown in FIG. 9 shows an example of a snap-fit latching mechanism. The locking mechanism 920 includes a latch tab 922. The latch tab 922 defines a protrusion 924. The latch tab 922 is configured to slidingly and removably engage the strike tab of a corresponding latching mechanism on an adjacent splitter module. In some embodiments, the latching mechanism 920 further provides a structure for locking a splitter modules to the base 900 in an engaged configuration. A locking mechanism can be configured to selectively lock the latching mechanism to prevent disengagement of a cable splitter module from a base 900. Such locking functionality can be implemented to prevent unauthorized de-coupling of one or more splitter modules.

Figure 10:
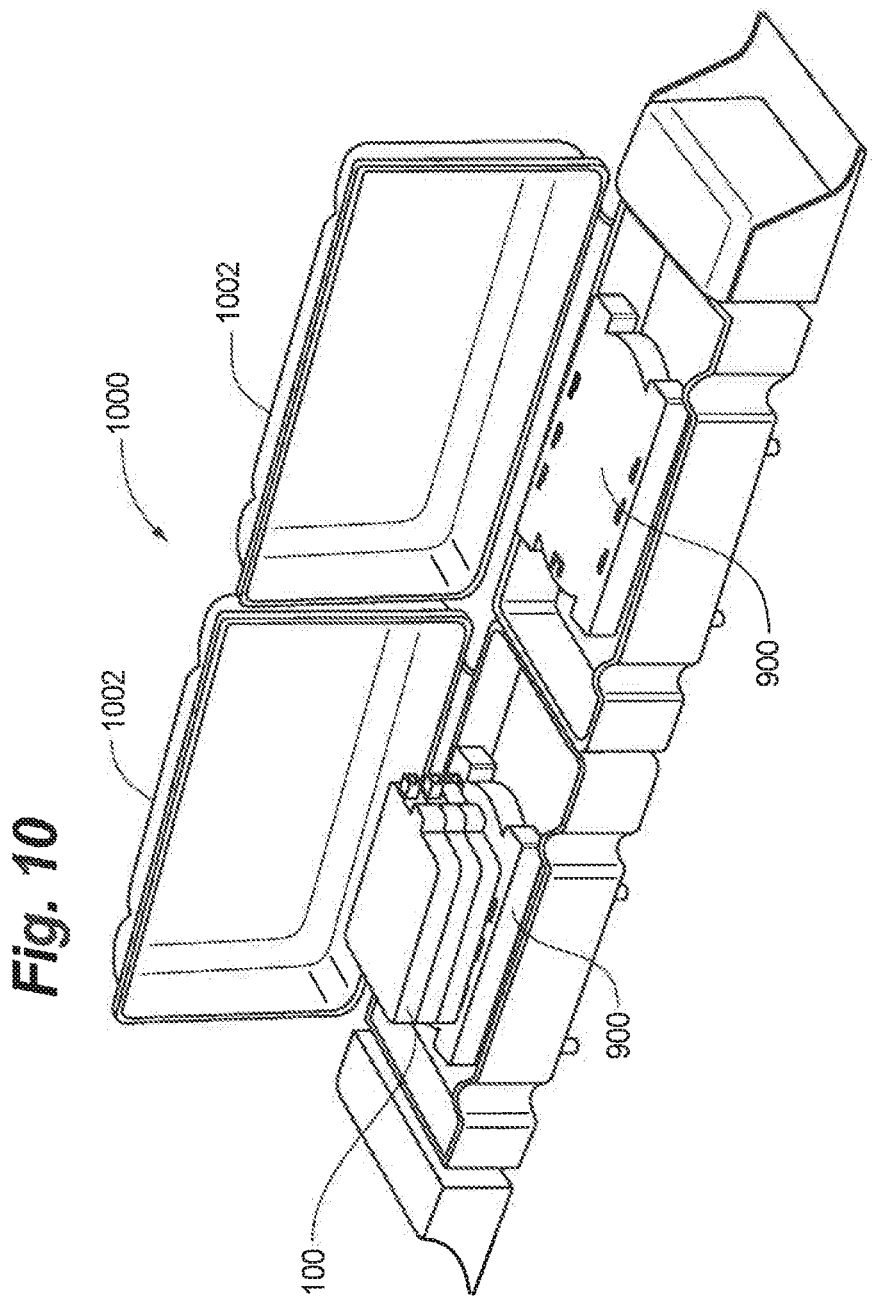
FIG. 10 is a perspective view of an embodiment of a splitter module enclosing system.

Referring now to FIG. 10, a perspective view is shown of a splitter module enclosing system 1000 in accordance with various implementations. An enclosing system is a system for housing one or more splitter modules. The enclosing system 1000 can include a stack of splitter modules 100. The enclosing system can include more than one stack of splitter modules 100. The enclosing system can be mounted on a wall, pedestal, vault, or other location in a network. An enclosing system generally provides a housing for splitter modules that require protection from tampering, a harsh or outdoor ambient environment, and the like. In some implementations the enclosing system 1000 can be configured as an aerial terminal.

The enclosing system includes an enclosure 1002. The enclosure 1002 can include on or more bases 900 for coupling to a splitter module. Each base 900 can be configured to couple to a stack of splitter modules. An enclosure can have a certain number of bases to accept a certain number of splitter module stacks. Each base 900 can be consistent with those described above with reference to FIG. 9. In some cases, one or more bases are integral to an enclosure. In some cases, one or more bases are a part of another component housed by an enclosure.

In some implementations, the enclosure 1002 is a hardened enclosure. A hardened enclosure provides a weatherproof and tamperproof housing for mounting in unsecured areas or outdoors. A hardened enclosure provides an interior environment that is separated from an ambient environment. In some implementations, the enclosure 1002 is not a hardened enclosure. In such cases, the enclosure can be mounted in secured areas such as network rooms and the like.

Connector Types

The splitter modules disclosed herein can be implemented with a variety of interfaces between the interior and exterior of the splitter module. Generally, the cable ports of a splitter module provide communication cables with access to the interior of the splitter modules. In various embodiments, cable adapters are used to interface communication cables external to a splitter module with the components inside the module. Splitter modules can, for example, use hardened or non-hardened adapters to interface with communication cables.

The example splitter module 100 depicted in FIGS. 1A and 1B includes non-hardened optical fiber cable adapters 106. However, the technology disclosed with reference to FIGS. 1A and 1B is not intended to be limited to embodiments having non-hardened optical fiber cable adapters. The adapters 106 depicted in FIGS. 1A and 1B are configured to receive an optical fiber cable and couple thereto. The adapters 106 can receive connectorized optical fiber cables. The non-hardened adapters 106 are configured to connect with a non-hardened optical fiber connector coupled to an optical fiber cable. In some implementations the non-hardened cable adapters 106 are configured as standard SC (e.g., Subscriber Connector) adapters. One example of an SC configuration is taught in U.S. Pat. No. 8,439,577, the entire content of which is incorporated herein by reference. Other examples of non-hardened cable adapter configurations that may be implemented include, but are not limited to LC, FC, ST, and MPO configurations. The cable adapters 106 may implement any desirable polish type for the included fiber (s), including but not limited to polish types such as PC, UPC, and APC.

Figure 11:
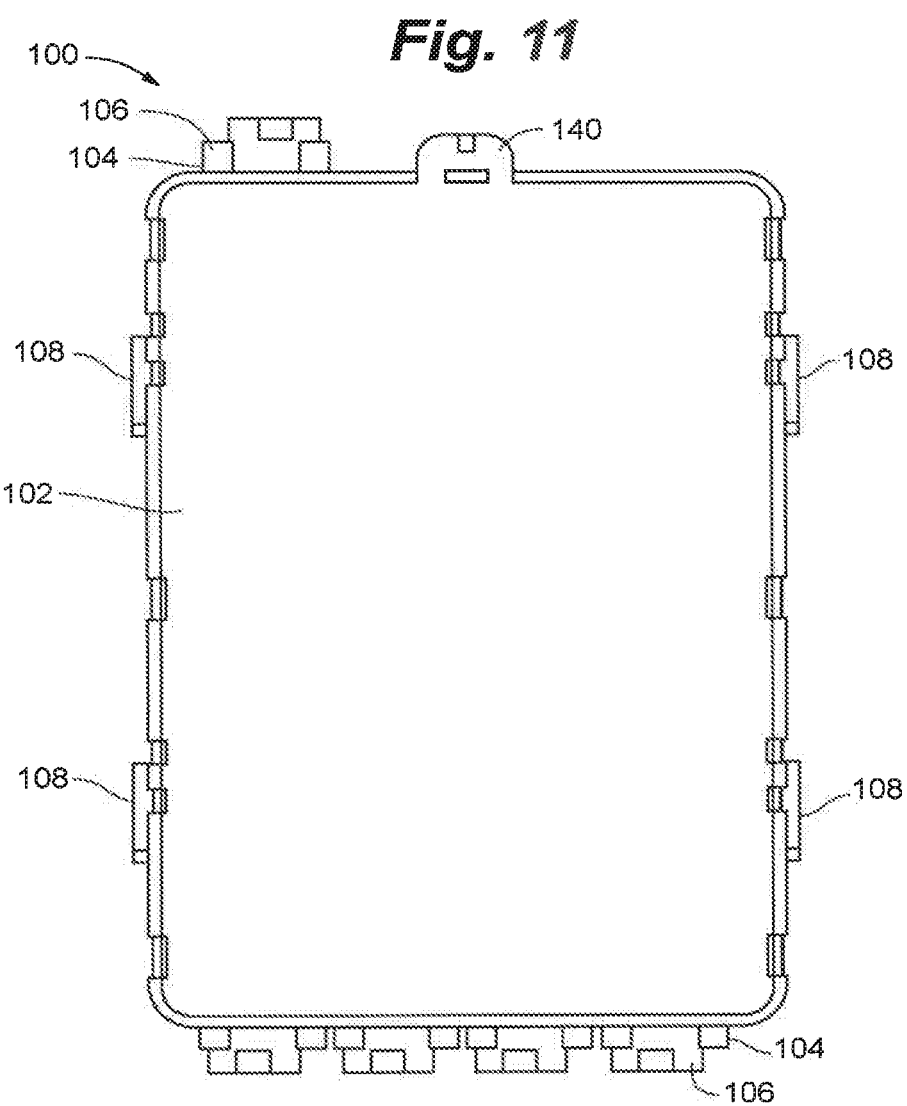
FIG. 11 is a top view of an embodiment of a hardened splitter module.

Referring now to FIG. 11, a top view is shown of a hardened splitter module 100 in accordance with various implementations. The hardened splitter module 100 has a stackable structure and function consistent with the various splitter modules discussed herein. As such, the splitter module 100 has a housing 102, a plurality of connection members 108, and a plurality of cable ports 104 consistent with those described herein. Hardened splitter modules are configured for use in harsh or other environments where tampering or unintended damage to the splitter and the components contained therein must be avoided. Hardened splitter modules can be configured for installation indoors in unsecure areas, where extra physical strength is required to prevent unintended damage. Hardened splitter modules can be configured for installation outdoors, such as mounted to a wall, pole, pedestal, vault, or other environment where the environment inside the splitter modules must be separated from the ambient environment to prevent destruction or damage of the components inside the splitter modules.

The hardened splitter module 100 incorporates one or more hardened cable adapters 106 for interfacing with optical fiber cables. Hardened connectors are configured to connect with hardened optical fiber connectors. Hardened adapters provide a sealed connection with hardened connectors, and prevent communication between the interior and exterior of a housing. Various hardened adapter configurations can be used to implement hardened cable adapters such as adapters 106. Some examples of hardened adapters that can be used are described in commonly-owned International Application No. PCT/US2016/065643, filed Dec. 8, 2016, and in U.S. Provisional Appl. No. 62/268,372, filed Dec. 16, 2015, to which PCT/US2016/065643 claims priority. The entire contents of these applications are incorporated herein by reference. As one possible example, in some cases the hardened cable adapters 106 can be optionally configured as one of the cable adapter assemblies depicted in FIGS. 16-22 and described in the corresponding text of PCT/US2016/065643. Other possible examples of hardened configurations that may optionally be incorporated into the design of the cable adapters 106 are discussed in U.S. Pat. No. 7,744, 288B2, U.S. Pat. No. 7,959,361B2, U.S. Pat. No. 7,762, 726B2, U.S. Pat. Publ. No. 2014/0241670A1, and U.S. Pat. No. 9,063,296B2, the entire contents of which are incorporated herein by reference. Other hardened adapter configurations may also be used.

A hardened splitter module can incorporate a housing 102 that is hardened. A hardened housing is configured to separate an environment inside the housing from an ambient environment. A hardened splitter module can include various seals for sealingly mating various components of the module. A hardened splitter module can also be constructed of strengthened or thickened materials such that a hardened splitter module is physically stronger than non-hardened counterparts. Stacks of one or more hardened splitter modules can incorporate a locking mechanism, such as those described above, for preventing the unintended removal of one or more splitter modules.

Figure 12:
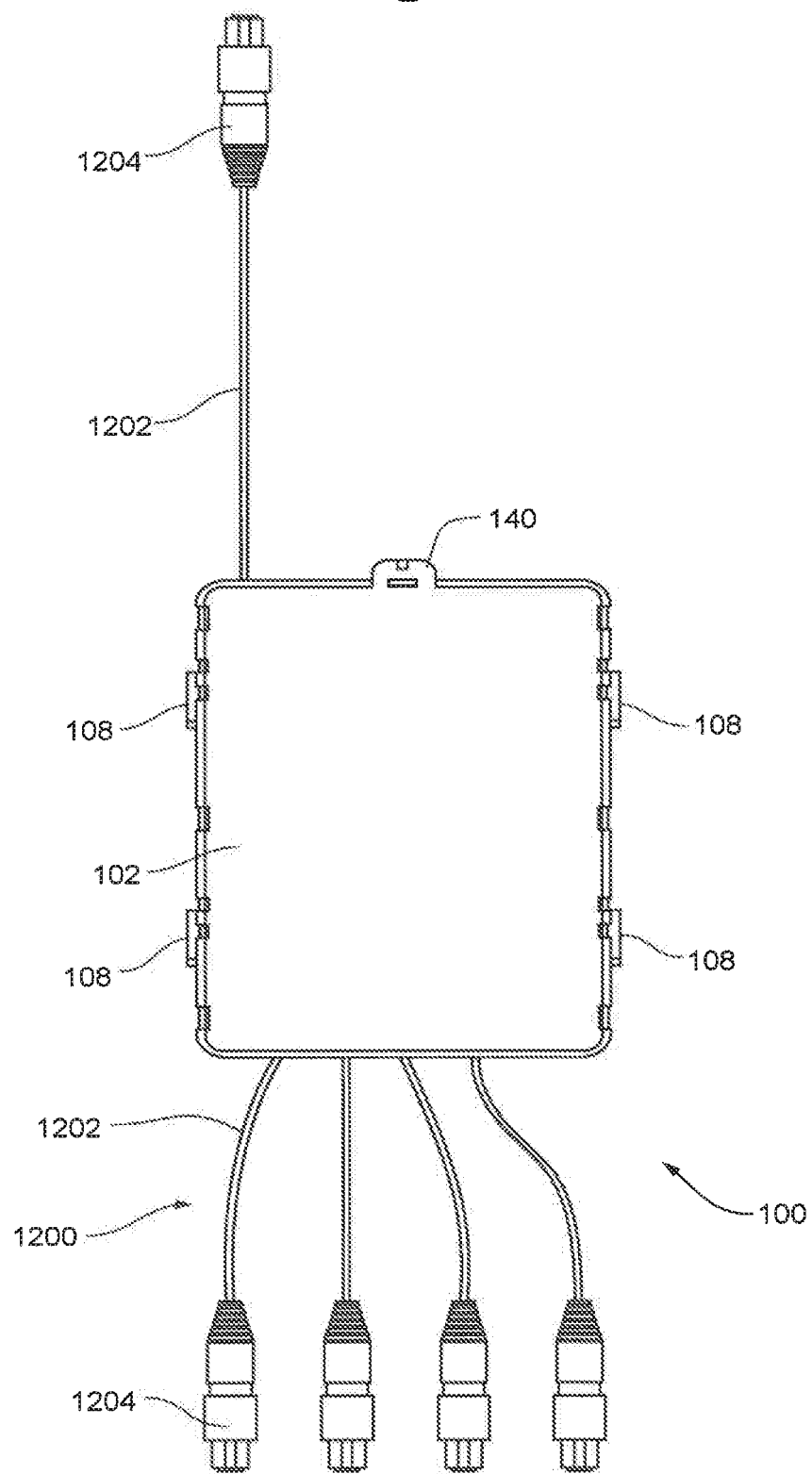
FIG. 12 is a top view of an embodiment of a splitter module with pigtail connectors.

Referring now to FIG. 12, a top view is shown of a splitter module 100 in accordance with various implementations herein. The splitter module 100 has a stackable structure and function consistent with the various splitter modules discussed herein. The splitter module 100 has a housing 102, a plurality of connection members 108, and a plurality of cable ports 104 consistent with those described herein. The splitter module 100 has an external cable assembly 1200. An external cable assembly is generally an assembly including one or more communication cables providing access to a splitter within a splitter module. The external cable assembly has one or more flexible leads 1202. Each flexible lead 1202 is terminated at an external optical fiber connection member 1204. The optical fiber connection members 1204 are optionally implemented as non-hardened optical fiber cable connectors. In some cases the non-hardened connectors 1204 are configured as standard SC (e.g., Subscriber Connector) connectors, such as is taught in U.S. Pat. No. 8,439,577, the entire content of which is incorporated herein by reference. Other examples of non-hardened cable adapter configurations that may be implemented include, but are not limited to LC, FC, ST, and MPO configurations. The cable adapters 106 may implement any desirable polish type for the included fiber(s), including but not limited to polish types such as PC, UPC, and APC.

In some cases, the splitter module 100 is configured to be installed indoors in a secure area, or outdoors in a weather tight enclosure. The flexible leads 1202 can be used to access other optical fiber components in an optical fiber assembly or network. The optical fiber connection members 1204 are configured to connect with various optical fiber components in an optical fiber assembly or network. The flexible leads 1202 can have a length sufficient to access various components within their functional environment. In some cases, flexible leads have a length less than 1 m. In some cases, flexible leads have a length of 1 m. In some cases, flexible leads have a length greater than 1 m. In some cases, the flexible leads have a length of 1.5 m. In some cases, the flexible leads have a length of greater than 1.5 m.

The housing 102 can include a strain-relieving portion for relieving strain in the one or more leads 1202. Relieving strain in the one or more flexible leads 1202 prevents damage from pulling or twisting forces applied to the flexible leads 1202. Specifically, strain relief can protect fiber leads, splitters, and other components inside the splitter module 100 from strain or damage. In some embodiments, the optical fiber ports 104 of the housing 102 are configured to clamp the leads 1202 such that strain is relieved or otherwise not transferred between the interior and exterior of the housing 102.

Figure 13:
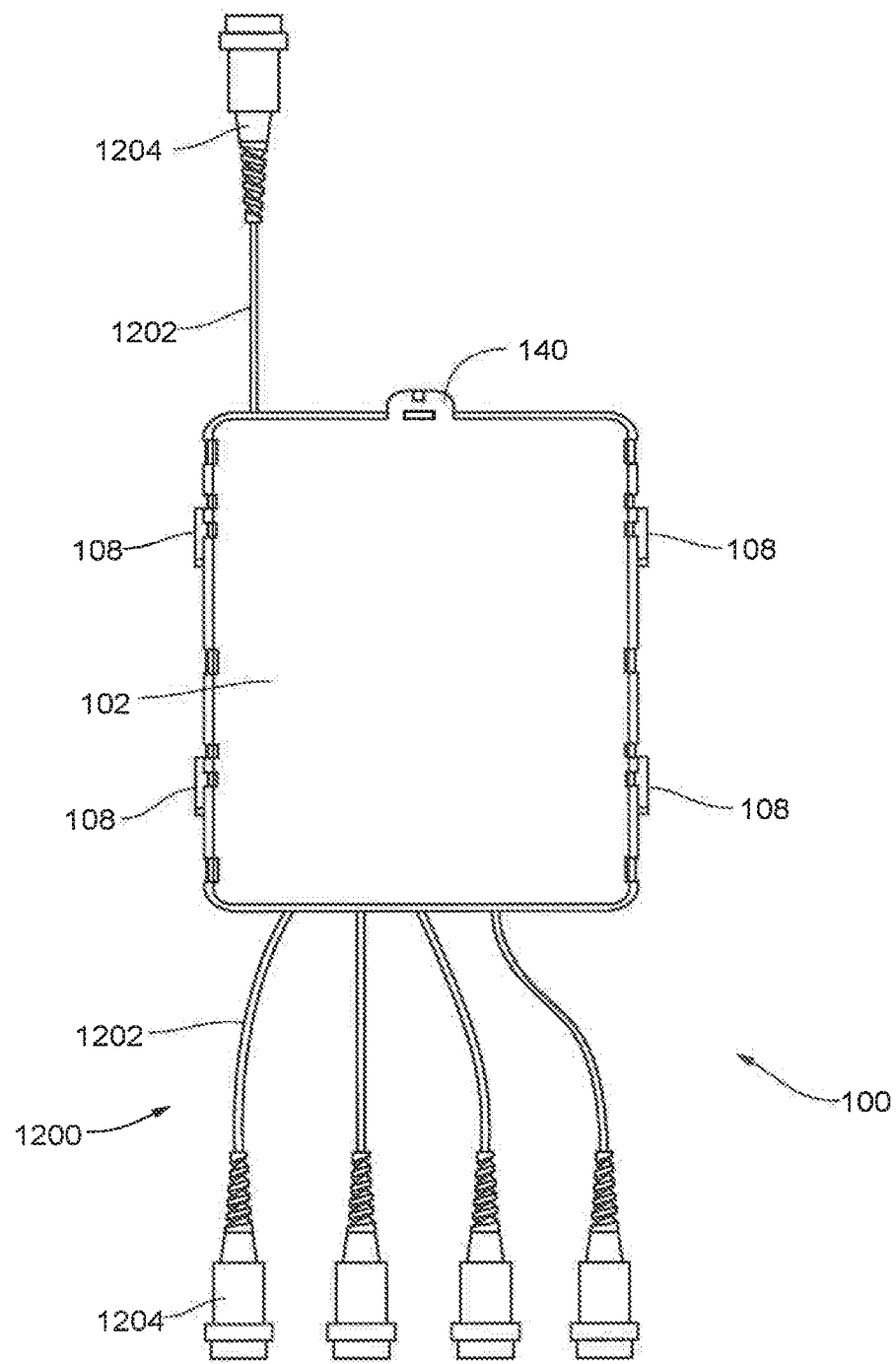
FIG. 13 is a top view of an embodiment of a hardened splitter module with pigtail connectors.

Referring now to FIG. 13, a top view is shown of a hardened splitter module 100 in accordance with various implementations herein. The hardened splitter module 100 has a stackable structure and function consistent with the various splitter modules discussed herein. The splitter module 100 has a housing 102, a plurality of connection members 108, and a plurality of cable ports 104 consistent with those described herein. The hardened splitter module 100 further includes an external cable assembly 1200. The external cable assembly has one or more flexible leads 1202. Each flexible lead 1202 is terminated at an external an optical fiber connection member 1004.

The hardened splitter module 100 incorporates one or more hardened optical fiber connection members 1204 for interfacing with optical fiber cables. The hardened optical fiber connection members 1204 can be configured to connect to hardened optical fiber connectors. The hardened optical fiber connection members 1204 can be configured to connect to other hardened or ruggedized assemblies, such as a hardened terminal. The hardened optical fiber connection members 1204 can provide a sealed connection with connectors, and prevent communication between the interior and exterior environments of a connection.

Some examples of hardened connector configurations that can optionally be used for the connection members 1204 are described in commonly-owned International Application No. PCT/US2016/065643, filed Dec. 8, 2016, and in U.S. Provisional Appl. No. 62/268,372, filed Dec. 16, 2015, to which PCT/US2016/065643 claims priority. The entire contents of these applications are incorporated herein by reference. As one possible example, in some cases the hardened connection members 1204 can be optionally configured as one of the cable connector assemblies depicted in FIGS. 6-15 and described in the corresponding text of PCT/US2016/065643. Other possible examples of hardened configurations that may optionally be incorporated into the design of the connection members 1204 are discussed in U.S. Pat. No. 7,744,288B2, U.S. Pat. No. 7,959,361B2, U.S. Pat. No. 7,762,726B2, U.S. Pat. Publ. No. 2014/0241670A1, and U.S. Pat. No. 9,063,296B2, the entire contents of which are incorporated herein by reference. Other hardened adapter configurations may also be used.

The hardened splitter module 100 can incorporate a housing 102 that is hardened, consistent with the hardened housings described above with reference to FIG. 11. Each port 104 can be configured to provide strain relief for each flexible cable lead 1002, consistent with the strain relief described above with reference to FIG. 12. Each port 104 of the hardened splitter module 100 can be configured to sealingly engage each flexible lead 1202 disposed therein. A cable port 104 can sealingly engages with a flexible lead 1202 such that a weatherproof, waterproof, or other connection can be formed. Such sealed connections prevent communication between the interior environment of a splitter module and an ambient environment.

One or more hardened splitter modules can be employed indoors in unsecured areas with or without being housed within an enclosure or cabinet. One or more hardened splitter modules can be employed outdoors, such as mounted to a wall, pole, pedestal, vault or other environment where the environment inside the splitter modules must be separated from the ambient environment. Stacks of one or more hardened splitter module can incorporate a locking mechanism, such as those described above, for preventing the unintended removal of one or more splitter modules. The hardened splitter modules 100 can have flexible leads 1202 of varying lengths. In some cases, the length of a flexible lead 1002 is less than 10 m. In some cases, the length of a flexible lead 1202 is equal to or greater than 10 m. In some cases, the length of a flexible lead 1202 is equal to or greater than 20 m. In some cases, the length of a flexible lead 1202 is equal to or greater than 25 m. In some cases, the length of a flexible lead 1202 is between 25 and 30 m. In some cases, the length of a flexible lead 1202 is less than 30 m. In some cases, the length of a flexible lead 1202 is greater than 30 m.

Splitter Types

The various splitter modules disclosed herein can be used to house or otherwise carry a variety of network components. Specifically, a variety of optical fiber communication network components can be housed by a splitter module. Splitter modules can be used to house a variety of optical splitting components. Splitter modules can be used to house one or more Passive Optical Splitters (POS). Splitter modules can be used to house one or more Fused Biconical Taper (FBT) splitters or Planar Lightwave Circuit (PLC) splitters. The optical splitters employed in the splitter modules can have a variety of splitting configurations. The possible splitting configurations can include 1.times.2, 1.times.4, 1.times.8, 1.times.16, 1.times.32, 1.times.64, and other splitting configurations.

In some cases, a stack of splitter modules is composed of splitters having identical splitting configurations. For example, a stack of splitter modules can be formed wherein each splitter module has a 1.times.2, 1.times.4, 1.times.8, 1.times.16, 1.times.32, 1.times.64, or other splitting configuration. The use of likes splitting configurations can prevent unequal power losses among different modules in a stack. The splitter modules can be configured to provide a desired splitting configuration for a network system. For example, a stack of four splitter modules each having a 1.times.2 splitting configuration can be used to create a network system having a 1.times.8 splitting configuration. In some implementations, stacks can include splitters having disparate splitting configurations. Additional splitter modules can be added to increase the amount of splitting. Likewise, splitter modules can be removed to provide a network system having a reduced amount of splitting. Various combinations of serial and parallel splitting are possible using the splitter modules disclosed herein. Configuring or altering existing configurations is thus facilitated by the modular splitter modules disclosed herein.

Locking Mechanisms

The splitter modules disclosed herein can include a locking mechanism. A locking mechanism can be used to prevent the unintended disengagement of a module from an adjacent module or base. Locking mechanisms can be used in addition to or in the alternative of the various latching mechanisms disclosed herein. Locking mechanisms can be used in applications where standalone stacks of one or more splitter modules exist without being housed in an enclosure, cabinet, room, or other secure environment.

In some implementations, a security screw is engaged between each pair of adjacent splitter modules. In some cases, a security screw is engaged between each module at the bottom of a stack and the one or more bases with which each module is coupled. In some cases a single security screw may engage all splitter modules in a stack. For example, in some cases a single security screw may be inserted through the passages 708 of each module's latching mechanism as described above with respect to FIG. 7. Security screws can include various heads requiring specialized tools for installation or removal. In some embodiments, security screws use heads requiring a 216 tool for installation or removal.

FIG. 14 depicts one possible implementation of a locking mechanism. FIG. 14 depicts a side view of a stack of splitter modules that are consistent with the various splitter modules described herein. The splitter modules 1100 each have a housing and a plurality of connection members. The splitter modules 1100 include a top splitter module and a bottom splitter module. Each splitter module 1100 includes a security screw structure 1400. A security screw structure is generally configured to allow a splitter module to be secured to adjacent splitter modules or a mounting base located above or below the splitter module in a stack. In this example, each security screw structure 1400 includes a straight receptacle 1402 and a threaded receptacle 1404. A security screw 1410 is inserted through the straight receptacle 1402 of the top splitter module and engaged with the threaded receptacle 1404 of the bottom splitter module such that relative movement between the top splitter module and the bottom splitter module is prohibited. Although FIG. 14 depicts a stack of two splitter modules 1100, a stack having any number of splitter modules can be secured using security screw mechanisms.

Materials

The splitter modules disclosed herein can be constructed of a variety of materials. In some cases the splitter module housing is constructed of a polymer. The splitter module housing can be constructed of a plastic. The splitter module housing can be constructed of a thermoplastic. The splitter module housing can be constructed of ABS, PC, PVC, nylon, PLA, PE, PP, PS, PTFE, PA, PU, and the like. The splitter module housing can be constructed of a metal. The splitter module housing can be constructed of a wood or wood fiber material. The splitter module housing can be constructed of a ceramic. Other housing materials are contemplated, including combinations of two or more of the above-references materials.

The various components of the splitter modules can also be constructed of the materials listed above. In some cases, the connection members of the splitter modules are substantially rigid. In some cases, the connection members are constructed of the same materials as the splitter module housing. In some cases, the connection members are integral with the splitter module housing. In some cases, the latching mechanism is constructed of flexible and resilient materials. The latching mechanism can be constructed of a resilient thermoplastic. In some cases, the latching mechanism is constructed of the same materials as the splitter module housing. In some cases, the splitter module housing, the connection members, and the locking mechanism are constructed of the same material. In such cases, the rigidity and flexibility of various components can be controlled by varying material thicknesses and geometry.

It should be noted that, as used in this specification and the appended claims, the singular forms "a," "an," and "the" include plural referents unless the content clearly dictates otherwise. Thus, for example, reference to an apparatus containing "a member" includes an apparatus with two or more members. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein.

What is claimed is:

1. An optical splitter module, comprising:
an optical splitter housing having a length extending along a longitudinal axis of the housing, a width extending transverse to the longitudinal axis along a width axis, and a stacking axis that is perpendicular to the longitudinal axis and to the width axis, the housing including
a bottom wall and a top wall,
an optical splitter storage area between the bottom wall and the top wall,
a first end wall,
a second end wall opposite the first end wall,
a first side wall, and
a second side wall opposite the first side wall; and
a connection member including a wall member having a first end nearer the top wall and a second end nearer the bottom wall, the first end including a notch, and the second end including a tab projecting beyond the bottom wall; and
wherein the first end of the wall member and the top wall delimit a slot extending substantially parallel to the longitudinal axis of the housing;
wherein the tab of the connection member is configured to access a slot of an adjacent connection member of a first additional instance of the optical splitter module and slidingly engage with the slot of the adjacent connection member in a first connection configuration that restricts relative movement of the optical splitter module and the adjacent optical splitter module along the stacking axis;
wherein the notch of the connection member is configured to provide passage for a tab of an adjacent connection member of a second additional instance of the optical splitter module to access the slot of the connection member and slidingly engage with the slot of the connection member in a second connection configuration that restricts relative movement of the optical splitter module and the adjacent optical splitter module along the stacking axis; and
wherein the first end wall includes a cable port providing access to the optical splitter storage area, and the second end wall includes a plurality of cable ports providing access to the optical splitter storage area.

2. An optical component module, comprising:
an optical component housing having a length extending along a longitudinal axis of the housing, a width extending transverse to the longitudinal axis along a width axis, and a stacking axis that is perpendicular to the longitudinal axis and to the width axis, the housing including
a bottom wall and a top wall,
an optical component storage area between the bottom wall and the top wall,
a first side wall including an arrangement of first side connection members,
a second side wall including an arrangement of second side connection members,
a third side wall including a cable port providing access to the optical component storage area, and
a fourth side wall including a plurality of cable ports providing access to the optical component storage area; and
wherein each of the first and second side connection members comprises a wall member having a first end and a second end, the first end at least partially defining a slot extending substantially parallel to the longitudinal axis of the housing, and the second end including a tab projecting from the wall member;
a wall member having a first end and a second end, the first end including a notch, and the second end including a tab projecting from the wall member, and a slot extending substantially parallel to the longitudinal axis of the housing;

wherein the tab of the connection member is configured to access a slot of an adjacent connection member of a first additional instance of the cable component module and slidingly engage with the slot of the adjacent connection member in a first connection configuration that restricts relative movement of the cable component module and the adjacent cable component module along the stacking axis; and wherein the notch of the connection member is configured to provide passage for a tab of an adjacent connection member of a second additional instance of the cable component module to access the slot of the connection member and slidingly engage with the slot of the connection member in a second connection configuration that restricts relative movement of the cable component module and the adjacent cable component module along the stacking axis.

3. The optical component stacking system of claim 2, further comprising a latching mechanism at the third side wall;

wherein the latching mechanism is configured to removably engage an additional instance of the latching mechanism on the additional instance of the optical component housing to selectively stop sliding disengagement of the optical component housing from the additional instance of the optical component housing.

4. The optical component stacking system of claim 3, wherein the latching mechanism comprises a latch tab and a strike tab spaced apart from the latch tab;

wherein the latch tab is configured to slidingly and removably engage the strike tab on the corresponding additional latching mechanism in a first connection configuration; and wherein the strike tab is configured to slidingly and removably engage the latch tab on the additional latching mechanism in a second connection configuration.

5. The optical component stacking system of claim 4, wherein the latch tab comprises a protrusion that engages the strike tab of the additional latching mechanism, and wherein the latch tab comprises a flexible material that enables deflection of the latch tab and the protrusion relative to the strike tab of the additional latching mechanism.

6. The optical component stacking system of claim 2, wherein each of the connection members comprises an outer wall member that forms part of the respective slot, the outer wall member including a notch configured to receive the tab of the respective additional connection member of the additional optical component housing.

7. The optical component stacking system of claim 2, wherein the first end of the wall member of each connection member is configured to mate with the second end of the wall member of the additional connection member on the additional optical component housing, and wherein the first end of the wall member of the additional connection member is configured to mate with the second end of the wall member of each connection member, whereby mating of the ends of the wall members supports the stacking of the cable component module and the additional cable component module along the stacking axis.

8. The optical component stacking system of claim 2, further comprising an optical component assembly positioned within the optical component storage area, a plurality of fiber leads connected to the optical component assembly, and a plurality of cable assemblies, wherein each cable assembly is connected to one of the fiber leads, wherein each cable assembly extends outside the housing through one of the cable ports, and wherein each cable assembly is terminated outside the housing by an optical fiber connection member.

9. The optical component stacking system of claim 2, further comprising a plurality of cable adapters mounted within the plurality of cable ports for connecting fiber leads of an optical component assembly inside the housing.

10. A cable component module, comprising:
a housing having a length extending along a longitudinal axis of the housing, a width extending transverse to the longitudinal axis along a width axis, and a stacking axis that is perpendicular to the longitudinal axis and to the width axis, the housing including
an optical component storage area,
a plurality of cable ports providing access to the optical component storage area,
a first end,
a second end opposite the first end,
a first side, and
a second side opposite the first side; and
a connection member at the first side, the connection member including
a wall member having a first end and a second end, the first end including
a notch, and the second end including a tab projecting from the wall member, and
a slot extending substantially parallel to the longitudinal axis of the housing;
wherein the tab of the connection member is configured to access a slot of an adjacent connection member of a first additional instance of the cable component module and slidingly engage with the slot of the adjacent connection member in a first connection configuration that restricts relative movement of the cable component module and the adjacent cable component module along the stacking axis; and
wherein the notch of the connection member is configured to provide passage for a tab of an adjacent connection member of a second additional instance of the cable component module to access the slot of the connection member and slidingly engage with the slot of the connection member in a second connection configuration that restricts relative movement of the cable component module and the adjacent cable component module along the stacking axis.

11. The cable component module of claim 10, wherein the connection member is a first side connection member, and further comprising:
a second side connection member at the second side of the housing opposite from the first side connection member, the second side connection member including
a wall member having a first end and a second end including a tab projecting from the wall member, and
a slot extending substantially parallel to the longitudinal axis of the housing;
wherein the tab of the second side connection member is configured to slidingly engage with a slot of an adjacent second side connection member of the first additional instance of the cable component module in the first connection configuration to restrict relative movement along the stacking axis; and
wherein the slot of the second side connection member is configured to slidingly engage with a tab of an adjacent second side connection member of the second additional instance of the cable component module in the second connection configuration to restrict relative movement along the stacking axis.

12. The cable component module of claim 11, wherein the sliding engagement of the first side connection members and the second side connection members restricts side-to-side movement of the cable component module and the adjacent cable component module in a direction of the width axis.

13. The cable component module of claim 11, wherein each of the first and second side connection members comprises an outer wall member that forms part of the respective slot, the outer wall member including a notch configured to selectively receive the tab of the respective adjacent connection member.

14. The cable component module of claim 11, wherein the first side connection member and the second side connection member form a first connection member pair, and further comprising a second connection member pair including another first side connection member and another second side connection member.

15. The cable component module of claim 10, wherein the first end of the wall member of the connection member is configured to mate with the second end of the wall member of the adjacent connection member of the second additional instance of the cable component module, and wherein the second end of the wall member of the connection member is configured to mate with the first end of the wall member of the adjacent connection member of the first additional instance of the cable component module, whereby mating of the ends of the wall members supports the stacking of the cable component module and the first and second additional instances of the cable component module along the stacking axis.

16. The cable component module of claim 10, further comprising a latching mechanism at the first end of the housing;
   wherein the first and second additional instances of the cable component module each have a corresponding adjacent instance of the latching mechanism;
   wherein the latching mechanism is configured to removably engage the adjacent latching mechanism in one of the first connection configuration and the second connection configuration; and
   wherein the latching mechanism is configured to removably engage the adjacent latching mechanism in the other of the first connection configuration and the second connection configuration;
   whereby engagement of the respective latching mechanisms stops sliding disengagement of the cable component module and the adjacent cable component module.

17. The cable component module of claim 16, further comprising a locking mechanism for selectively locking the latching mechanism to prevent disengagement of the cable component module from the adjacent cable component module.

18. The cable component module of claim 10, further comprising an optical component assembly positioned within the optical component storage area, and a plurality of fiber leads connected to the optical component assembly, wherein each of the cable ports provides access to one of the fiber leads.

19. The cable component module of claim 18, further comprising a plurality of cable assemblies, wherein each cable assembly is connected to one of the fiber leads, wherein each cable assembly extends outside the housing through one of the cable ports, and wherein each cable assembly is terminated outside the housing by an optical fiber connection member.

20. The cable component module of claim 18, further comprising a plurality of cable adapters mounted within the plurality of cable ports, wherein each of the fiber leads is terminated inside the housing by an optical fiber connection member configured to connect with one of the cable adapters.

* * * * *